US008814698B1

(12) United States Patent
Lee

(10) Patent No.: US 8,814,698 B1
(45) Date of Patent: Aug. 26, 2014

(54) GRAPHICAL USER INTERFACES IN COMPUTER-IMPLEMENTED MULTIPLAYER GAMES

(75) Inventor: Curtis Lee, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/436,598

(22) Filed: Mar. 30, 2012

(51) Int. Cl.
*A63F 13/12* (2006.01)

(52) U.S. Cl.
USPC ........ 463/42; 463/9; 463/29; 463/40; 463/43; 709/202; 709/203; 709/204

(58) Field of Classification Search
USPC ............... 463/9, 39–43, 16–20; 709/204–207
See application file for complete search history.

(56) References Cited

U.S. PATENT DOCUMENTS

| 6,539,421 | B1 * | 3/2003 | Appelman et al. | 709/206 |
| 6,677,968 | B1 * | 1/2004 | Appelman | 715/853 |
| 6,981,223 | B2 * | 12/2005 | Becker et al. | 715/753 |
| 7,058,690 | B2 * | 6/2006 | Maehiro | 709/206 |
| 7,115,035 | B2 * | 10/2006 | Tanaka | 463/42 |
| 8,037,139 | B1 * | 10/2011 | Fish et al. | 709/206 |
| 8,616,970 | B2 * | 12/2013 | Ducheneaut et al. | 463/31 |
| 2004/0224772 | A1 * | 11/2004 | Canessa et al. | 463/42 |

OTHER PUBLICATIONS

"CityVille: Zynga's Next City-Building Title", [online]. 2012, Copyright © 2012 F2pGames.com—Free to play. Games! [retrieved on Nov. 17, 2012]. Retrieved from the Internet: <http://www.f2pgames.com/2010/11/17/cityville-zyngas-next-city-building-title/>, (2010), 2 pgs.

"First Look: Zynga Take on Rivals with CityVille, A Casual Virtual Metropolis", online. 2010, © 2012 AOL Inc. [retrieved on Nov. 17, 2010].. Retrieved from the Internet: <http://techcrunch.com/2010/11/17/zynga-cityville/?utm_source=feedburner&utm_medium=feed&utm_campaign=Feed:+Techcrunch+%28TechCrunch%29>, (2010), 11 pgs.

* cited by examiner

*Primary Examiner* — Sunit Pandya
(74) *Attorney, Agent, or Firm* — Schwegman Lundberg & Woessner, P.A.

(57) ABSTRACT

This disclosure generally relates to systems and methods to provide graphical user interfaces in computer-implemented multiplayer games. The graphical user interface includes a friends panel that is operable between a collapsed condition and an expanded condition. The friends panel provides friends information display functionality, social network management functionality, and/or messaging functionality both in the collapsed condition and in the expanded condition. In the collapsed condition, the friends panel may comprise a friends bar that shows a row of friend cards or chiclets associated with respective friends of a host player associated with a displayed game instance, the friends bar being clear of a view of a virtual in-game environment shown in the game display, while the expanded friends panel may comprise a grid of friend cards or chiclets that functionally obscures the in-game environment.

23 Claims, 13 Drawing Sheets

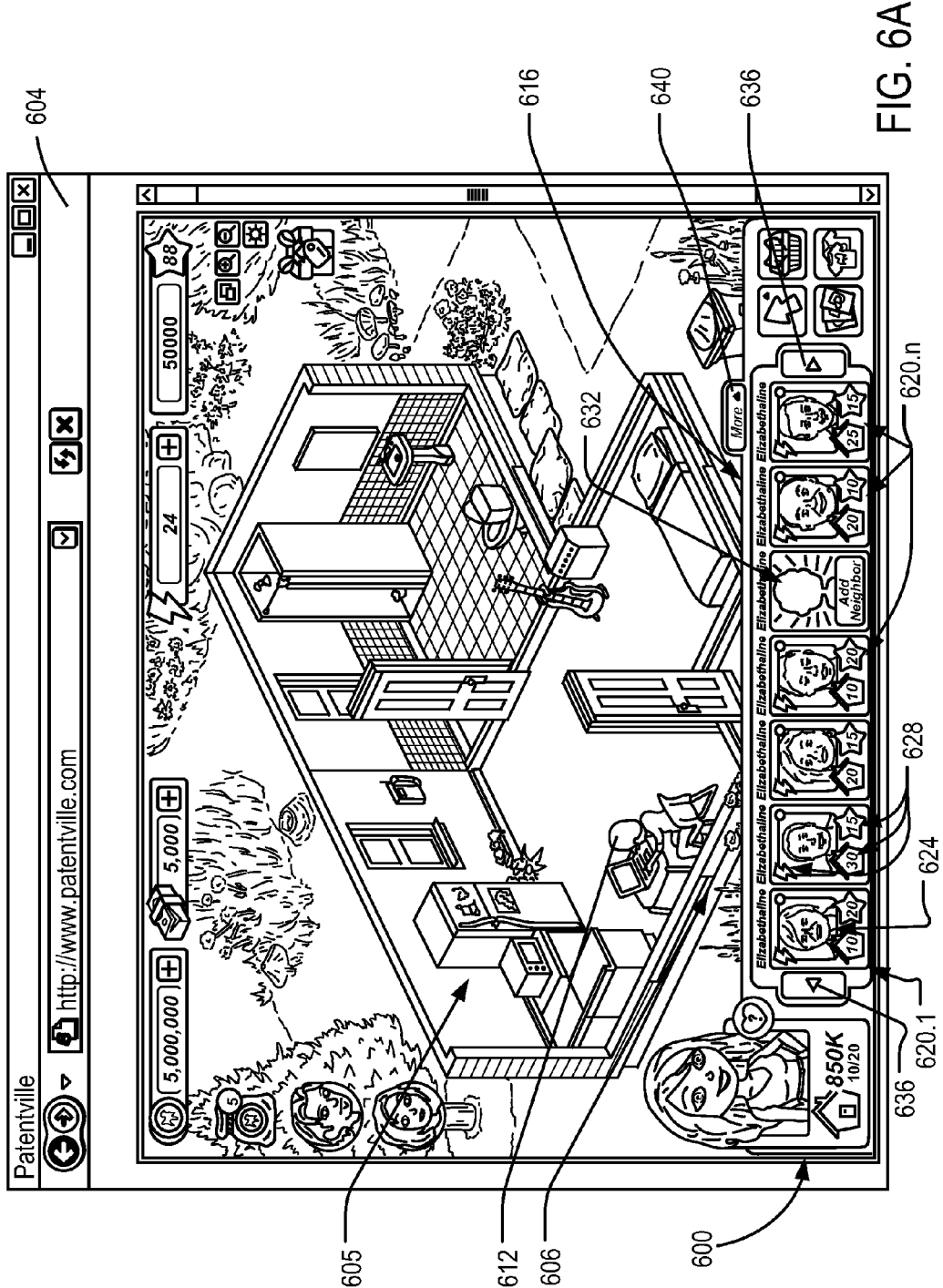

GRAPHICAL USER INTERFACES IN COMPUTER-IMPLEMENTED MULTIPLAYER GAMES

TECHNICAL FIELD

This disclosure relates to games and applications in general, and also to computer-implemented online games, such as online role-playing games (RPGs) that are playable by more than one person from more than one location.

BACKGROUND

In many online computer games, there is a virtual world or some other imagined playing space where a player of the game controls one or more player characters (herein "characters," "player characters," or "PCs"). Player characters can be considered in-game representations of the controlling player. As used herein, the terms player, user, entity, neighbor, friend, and the like may refer to the in-game player character controlled by that player, user, entity, or friend, unless context suggests otherwise. A game display can display a representation of the player character. A game engine accepts inputs from the player, determines player character actions, decides outcomes of events, and presents the player with a game display illuminating game play. In some games, there are multiple players, wherein each player controls one or more player characters.

An electronic social networking system typically operates with one or more social networking servers providing interaction between users such that a user can specify other users of the social networking system as "friends." A collection of users and the "friend" connections between users can form a social graph in such a social networking system that can be traversed to find second, third and more remote connections between users, much like a graph of nodes connected by edges can be traversed. Instead or in addition, an in-game social graph may be maintained.

Many online computer games are operated on an online social network. Such a network allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

Game displays generated on client devices typically provide graphical user interfaces (GUIs) to receive user input and to display game related information, including social networking information.

BRIEF DESCRIPTION OF THE DRAWINGS

FIGS. 6A-6B illustrate an example game display including a graphical user interface of a particular disclosed embodiment.

DESCRIPTION OF EXAMPLE EMBODIMENTS

Example embodiments described below with reference to, inter alia, FIGS. 4-6 disclose a method and system to provide a game display for a computer-implemented game that includes a graphical user interface comprising a selectively expandable panel that provides social networking functionalities, such as information display about friends of a particular player, social network management functionality, and/or messaging functionality.

Figure 6B:
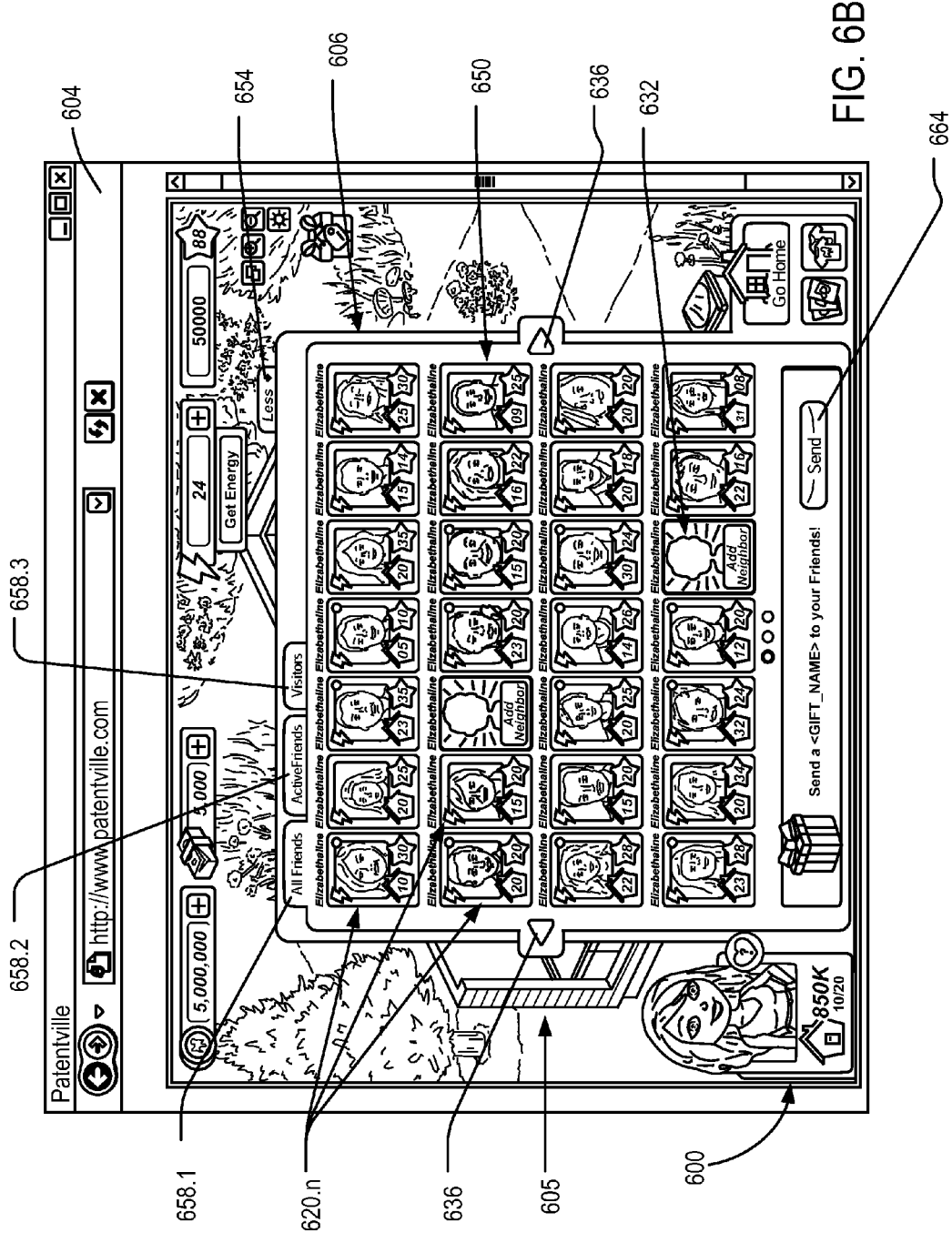

The expandable panel may thus be operable between a collapsed condition in which a virtual in-game environment shown in the game display is substantially unobscured by the expandable panel, and an expanded condition in which the expandable panel supplies a larger area and obscures at least part of the virtual in-game environment. As will be described in greater detail below, FIGS. 6A and 6B show an example embodiment in which the expandable panel provides a friends bar 616 in the collapsed condition (FIG. 6A) and provides an expanded friends panel 650 in the expanded condition (FIG. 6B).

Figure 7A:
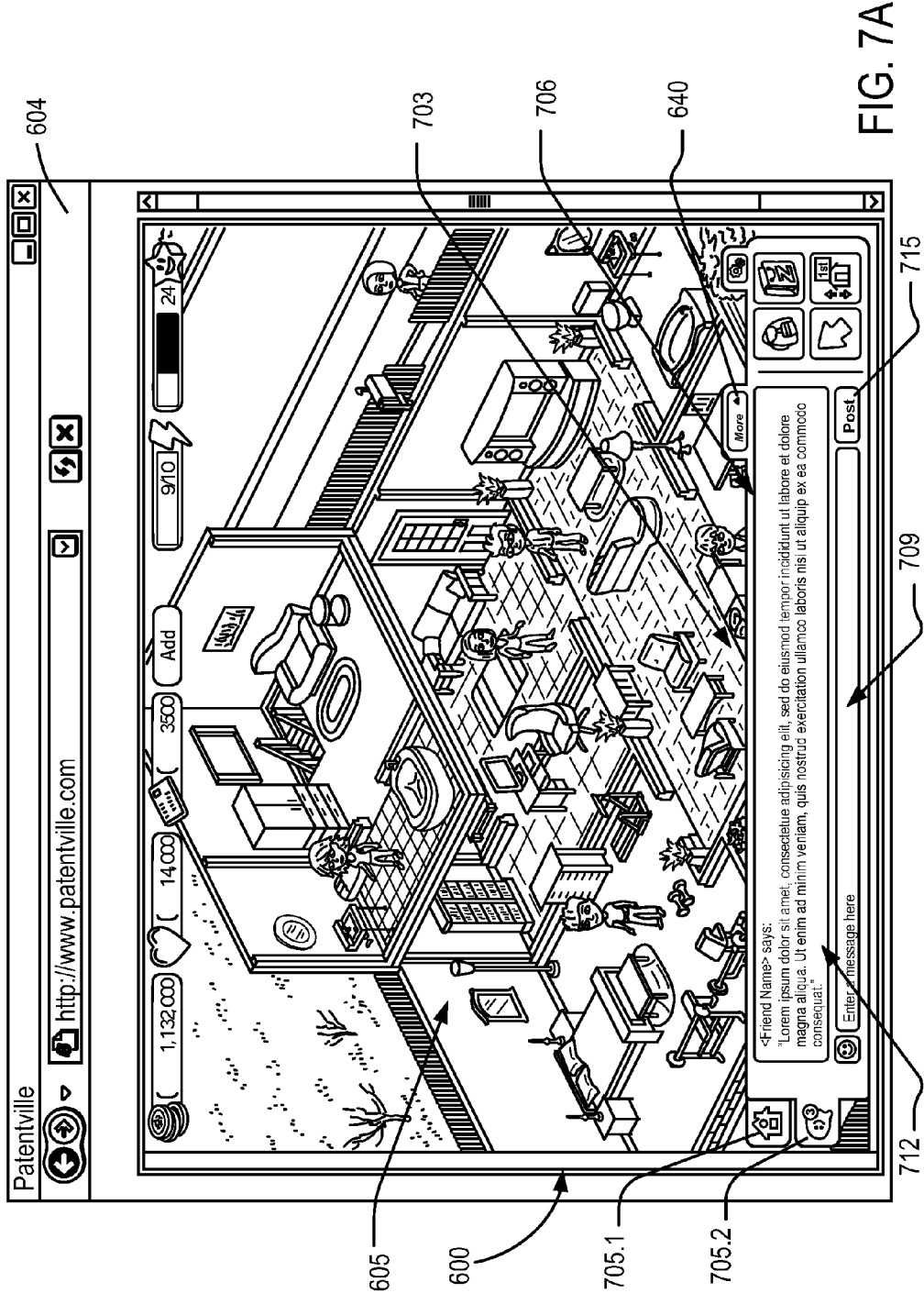
FIGS. 7A-7D illustrate an example game display including a graphical user interface of another disclosed embodiment.

The expandable panel may in some embodiments be operable between a friends display mode and a messaging mode. One example of such an embodiment is described herein with reference to FIG. 7A-7D, in which a friends panel is selectively switchable between a message bar 706 (FIG. 7A), an expanded message panel 730 (FIG. 7B), a friends bar 616 (FIG. 7C), and an expanded friends panel 650 (FIG. 7D).

These and further aspects of the example embodiment will be evident from the description that follows. An example game environment for implementing example embodiments is first described, whereafter example embodiments are described in greater specificity, in the context of the example game environment.

Example Game Environment

Figure 1:
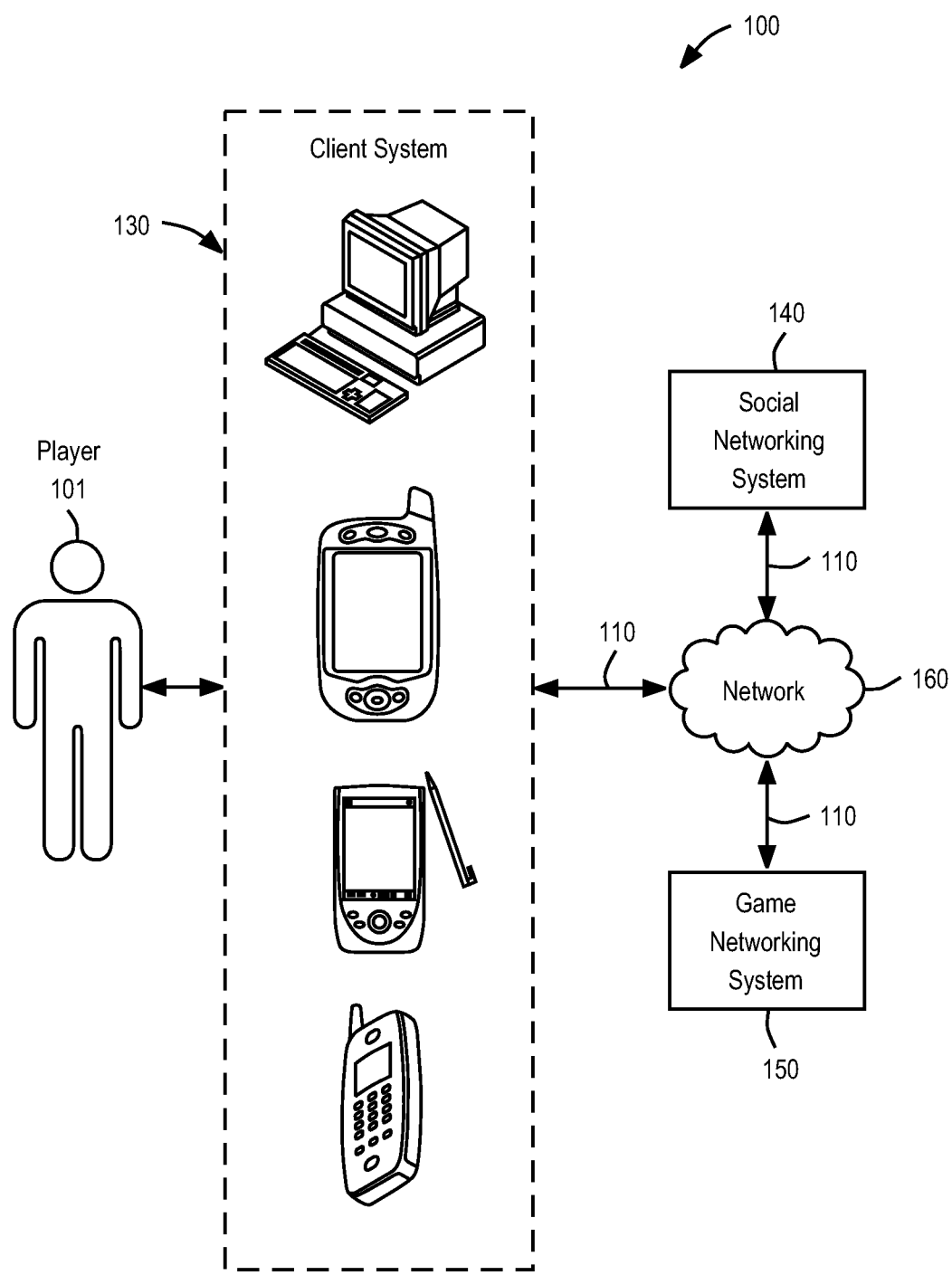
FIG. 1 illustrates an example of a system for implementing particular disclosed embodiments.

FIG. 1 illustrates an example of a system 100 for implementing various disclosed embodiments. In particular embodiments, system 100 comprises player 101, social networking system 140, game networking system 150, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 140 is a network-addressable computing system that can host one or more social graphs. Social networking system 140 can generate, store, receive, and transmit social networking data. Social networking system 140 can be accessed by the other components of system 100 either directly or via network 160. Game networking system 150 is a network-addressable computing system that can host one or more online games. Game networking system 150 can generate, store, receive, and transmit game-related data, such as, for example, game account data, game input, game state data, and game displays. Game networking system 150 can be accessed by the other components of system 100 either directly or via network 160. Player 101 may use client system 130 to access, send data to, and receive data from social networking system 140 and game networking system 150. Client system 130 can access social networking system 140 or game networking system 150 directly, via network 160, or via a third-party system. As an example and not by way of limitation, client system 130 may access game networking system 150 via social networking system 140. Client system 130 can be any suitable computing device, such as a personal computer, laptop, cellular phone, smart phone, computing tablet, or the like.

Although FIG. 1 illustrates a particular number of players 101, social networking systems 140, game networking systems 150, client systems 130, and networks 160, this disclosure contemplates any suitable number of players 101, social networking systems 140, game networking systems 150, client systems 130, and networks 160. As an example and not by way of limitation, system 100 may include one or more game networking systems 150 and no social networking systems 140. As another example and not by way of limitation, system 100 may include a system that comprises both social networking system 140 and game networking system 150. Moreover, although FIG. 1 illustrates a particular arrangement of player 101, social networking system 140, game networking system 150, client system 130, and network 160, this disclosure contemplates any suitable arrangement of player 101, social networking system 140, game networking system 150, client system 130, and network 160.

The components of system 100 may be connected to each other using any suitable connections 110. For example, suitable connections 110 include wireline (such as, for example, digital subscriber line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 140, game networking system 150, client system 130, and network 160, this disclosure contemplates any suitable connections between player 101, social networking system 140, game networking system 150, client system 130, and network 160. As an example and not by way of limitation, in particular embodiments, client system 130 may have a direct connection to social networking system 140 or game networking system 150, bypassing network 160.

Game Networking Systems

In an online computer game, a game engine manages the game state of the game. A game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs) and in-game objects. The game engine also manages game state, including player character state for currently active (online) and inactive (offline) players.

An online game can be hosted by game networking system 150, which can be accessed using any suitable connection with a suitable client system 130. A player may have a game account on game networking system 150, wherein the game account can contain a variety of information associated with the player 101 (e.g., the player's personal information, financial information, purchase history, player character state, and game state). In some embodiments, a player 101 may play multiple games on game networking system 150, which may maintain a single game account for the player 101 with respect to all the games, or multiple individual game accounts for each game with respect to the player 101. In some embodiments, game networking system 150 can assign a unique identifier to each player 101 of an online game hosted on game networking system 150. Game networking system 150 can determine that a player 101 is accessing the online game by reading the user's cookies, which may be appended to Hypertext Transfer Protocol (HTTP) requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmit user inputs or other events to the game engine, and receive instructions from the game engine. The game engine can be executed on any suitable system (such as, for example, client system 130, social networking system 140, or game networking system 150). As an example and not by way of limitation, client system 130 can download client components of an online game, which are executed locally, while a remote game server, such as game networking system 150, provides backend support for the client components and may be responsible for maintaining application data of the game, processing the inputs from the player 101, updating and/or synchronizing the game state based on the game logic and each input from the player 101, and transmitting instructions to client system 130. As another example and not by way of limitation, each time player 101 provides an input to the game through the client system 130 (such as, for example, by typing on the keyboard or clicking the mouse of client system 130), the client components of the game may transmit the player 101's input to game networking system 150.

Game Play

In particular embodiments, player 101 can engage in, or cause a player character controlled by him to engage in, one or more in-game actions. For a particular game, various types of in-game actions may be available to player 101. As an example and not by way of limitation, a player character in an online role-playing game may be able to interact with other player characters, build a virtual house, decorate the interior of a virtual house, attack enemies, go on a quest, and go to a virtual store to buy/sell virtual items. As another example and not by way of limitation, a player character in an online poker game may be able to play at specific tables, place bets of virtual or legal currency for certain amounts, discard or hold certain cards, play or fold certain hands, and play in an online poker tournament.

In particular embodiments, player 101 may engage in an in-game action by providing one or more user inputs to client system 130. Various actions may require various types and numbers of user inputs. Some types of in-game actions may require a single user input. As an example and not by way of limitation, player 101 may be able to harvest a virtual crop by clicking on it once with a mouse. Some types of in-game actions may require multiple user inputs. As another example and not by way of limitation, player 101 may be able to throw a virtual fireball at an in-game object by entering the following sequence on a keyboard: DOWN, DOWN and RIGHT, RIGHT, B. This disclosure contemplates engaging in in-game actions using any suitable number and type of user inputs.

In particular embodiments, player 101 can perform an in-game action on an in-game object or with respect to another player character. In-game actions performed with respect to another player character comprise "social interactions" as used herein. Actions performed with respect to non-player characters are not considered social interactions. An in-game object is any interactive element of an online game. In-game objects may include, for example, player characters, NPCs, in-game assets and other virtual items, in-game obstacles, game elements, game features, and other in-game objects. This disclosure contemplates performing in-game actions on any suitable in-game objects. For a particular in-game object, various types of in-game actions may be available to player 101 based on the type of in-game object. As an example and not by way of limitation, if player 101 encounters a virtual bear, the game engine may give him the options of shooting the bear or petting the bear. Some in-game actions may be available for particular types of in-game objects but not other types. As an example and not by way of limitation, if player 101 encounters a virtual rock, the game engine may give him the option of moving the rock; however, unlike the virtual bear, the game engine may not allow player 101 to shoot or pet the virtual rock. Furthermore, for a particular in-game object, various types of in-game actions may be available to player 101 based on the game state of the in-game object. As an example and not by way of limitation, if player 101 encounters a virtual crop that was recently planted, the game engine may give him only the option of fertilizing the crop, but if player 101 returns to the virtual crop later when it is fully grown, the game engine may give him only the option of harvesting the crop.

In particular embodiments, the game engine may cause one or more game events to occur in the game. Game events may include, for example, a change in game state, an outcome of an engagement, completion of an in-game obstacle, a transfer of an in-game asset or other virtual item, or a provision of access, rights and/or benefits. In particular embodiments, a game event is any change in game state. Similarly, any change in game state may be a game event. As an example and not by way of limitation, the game engine may cause a game event where the virtual world cycles between daytime and nighttime every 24 hours. As another example and not by way of limitation, the game engine may cause a game event where a new instance, level, or area of the game becomes available to player 101. As yet another example and not by way of limitation, the game engine may cause a game event where player 101's player character heals one hit point every 5 minutes. Game events may include asynchronous social events, as described in greater detail herein.

In particular embodiments, a game event or change in game state may be an outcome of one or more in-game actions. The game engine can determine the outcome of a game event or a change in game state according to a variety of factors, such as, for example, game logic or rules, player character in-game actions, player character state, game state of one or more in-game objects, interactions of other player characters, or random calculations. As an example and not by way of limitation, player 101 may overcome an in-game obstacle and earn sufficient experience points to advance to the next level, thereby changing the game state of player 101's player character (it advances to the next character level). As another example and not by way of limitation, player 101 may defeat a particular boss NPC in a game instance, thereby causing a game event where the game instance is completed, and the player advances to a new game instance. As yet another example and not by way of limitation, player 101 may pick the lock on a virtual door to open it, thereby changing the game state of the door (it goes from closed to open) and causing a game event (the player 101 can access a new area of the game).

In particular embodiments, player 101 may access particular game instances of an online game. A game instance is a copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players 101. A game instance is associated with a specific player 101 when one or more game parameters of the game instance are associated with the specific player 101. As an example and not by way of limitation, a game instance associated with a first player 101 may be named "First player's Play Area," or "First player's Game Instance." This game instance may be populated with the first player 101's player character and one or more in-game objects associated with the first player 101.

Such a game instance associated with a specific player 101 may be accessible by one or more other players, either synchronously or asynchronously with the specific player 101's game play. As an example and not by way of limitation, a first player 101 (i.e., the host player) may be associated with a first game instance, but the first game instance may be accessed by all first-degree friends in the first player 101's social network. As used herein, players thus accessing a game instance associated with another player are referred to as guest players, guests, visiting players, or visitors. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game.

In particular embodiments, the set of in-game actions available to a specific player may be different in a game instance that is associated with that player (e.g., in which the player is a host player) compared to a game instance that is not associated with that player (e.g., in which the player is a guest player). The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

Social Graphs and Social Networking Systems

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure may apply to any suitable social graph user.

The minimum number of edges to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend."

Within the social graph, each player (or player character) has a social network. A player's social network includes all users in the social graph within $N_{max}$ degrees of the player, where $N_{max}$ is the maximum degree of separation allowed by the system managing the social graph (such as, for example, social networking system 140 or game networking system 150). In one embodiment, $N_{max}$ equals 1, such that the player's social network includes only first-degree friends. In another embodiment, $N_{max}$ is unlimited and the player's social network is coextensive with the social graph.

In particular embodiments, the social graph is managed by game networking system 150, which is managed by the game operator. In other embodiments, the social graph is part of a social networking system 140 managed by a third-party (e.g., Facebook, Friendster, Myspace). In yet other embodiments, player 101 has a social network on both game networking system 150 and social networking system 140, wherein player 101 can have a social network on the game networking system 150 that is a subset, superset, or independent of the player's social network on social networking system 140. In such combined systems, game networking system 150 can maintain social graph information with edge type attributes that indicate whether a given friend is an "in-game friend," an "out-of-game friend," or both. The various embodiments disclosed herein are operable when the social graph is managed by social networking system 140, game networking system 150, or both.

Figure 2:
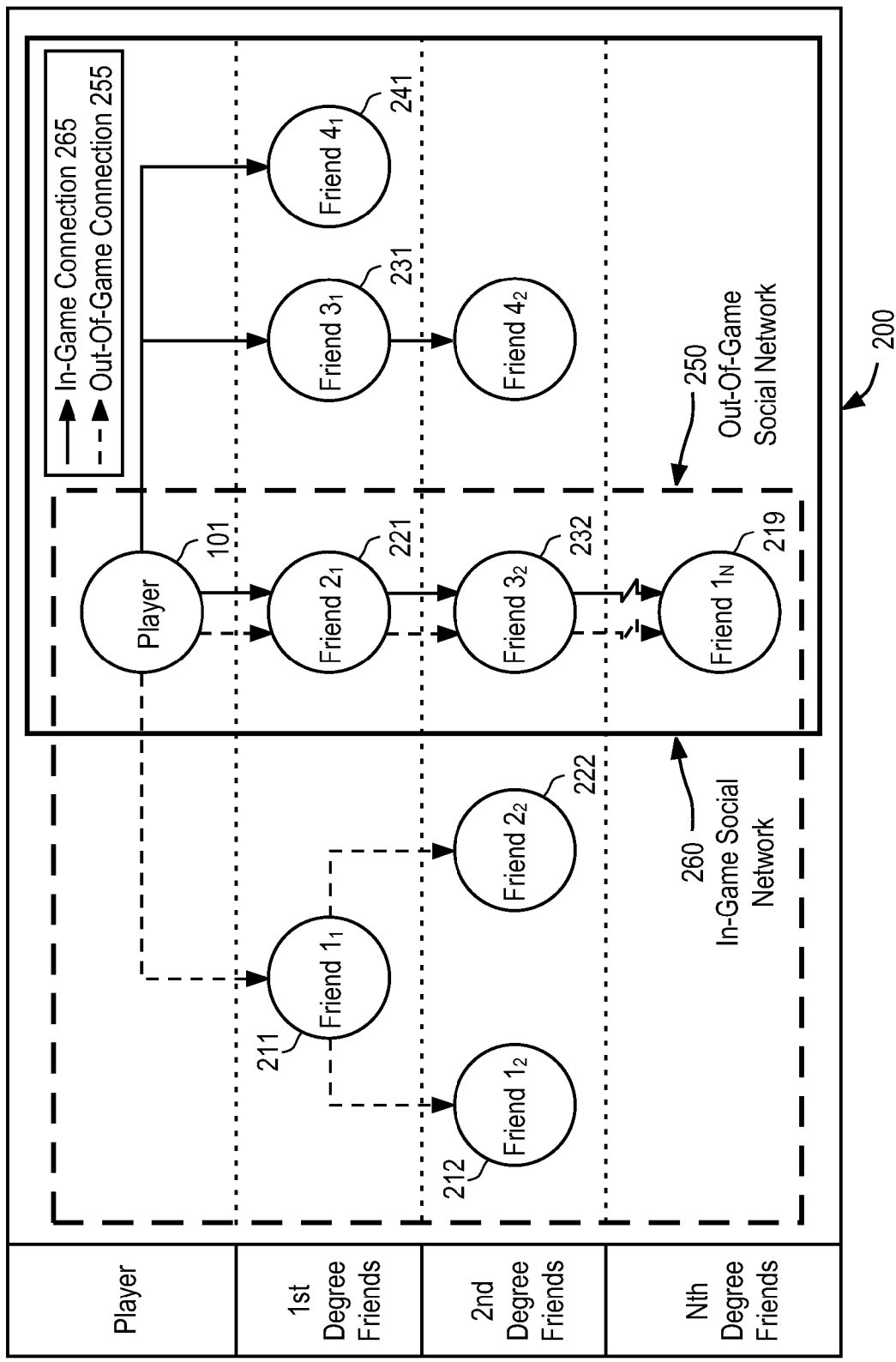
FIG. 2 illustrates an example social network.

FIG. 2 shows an example of a social network within a social graph 200. As shown, player 101 can be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration and not by way of limitation, the details of out-of-game social network 250 will be described in relation to player 101. As used herein, the terms "player" and "user" can be used interchangeably and can refer to any user in an online multiuser game system or social networking system. As used herein, the term "friend" can mean any node within a player's social network.

As shown in FIG. 2, player 101 has direct connections with several friends. When player 101 has a direct connection with another individual, that connection is referred to as a first-degree friend. In out-of-game social network 250, player 101 has two first-degree friends. That is, player 101 is directly connected to friend $1_1$ 211 and friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that player 101 has four second-degree friends to which he is connected via his connection to his first-degree friends. Second-degree friend $1_2$ 212 and friend $2_2$ 222 are connected to player 101 via his first-degree friend $1_1$ 211. The limit on the depth of friend connections, or the number of degrees of separation for associations that player 101 is allowed is typically dictated by the restrictions and policies implemented by social networking system 140 (FIG. 1).

In various embodiments, player 101 can have Nth-degree friends connected to him through a chain of intermediary degree friends, as indicated in FIG. 2. For example, Nth-degree friend $1_N$ 219 is connected to player 101 via second-degree friend $3_2$ 232 and one or more other higher-degree friends. Various embodiments may take advantage of and utilize the distinction between the various degrees of friendship relative to player 101.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, player 101 has out-of-game connections 255 to a plurality of friends, forming out-of-game social network 250. Here, friend $1_1$ 211 and friend $2_1$ 221 are first-degree friends with player 101 in his out-of-game social network 250. Player 101 also has in-game connections 265 to a plurality of players, forming in-game social network 260. Here, friend $2_1$ 221, friend $3_1$ 231, and friend $4_1$ 241 are first-degree friends with player 101 in his in-game social network 260. In some embodiments, it is possible for a friend to be in both the out-of-game social network 250 and the in-game social network 260. Here, friend $2_1$ 221 has both an out-of-game connection 255 and an in-game connection 265 with player 101, such that friend $2_1$ 221 is in both player 101's in-game social network 260 and player 101's out-of-game social network 250. As used herein, players forming part of the in-game social network 260 may also be referred to as "friend players."

As with other social networks, player 101 can have second-degree and higher-degree friends in both his in-game and out-of-game social networks. In some embodiments, it is possible for player 101 to have a friend connected to him both in his in-game and out-of-game social networks, wherein the friend is at different degrees of separation in each network. For example, if friend $2_2$ 222 had a direct in-game connection with player 101, friend $2_2$ 222 would be a second-degree friend in player 101's out-of-game social network 250, but a first-degree friend in player 101's in-game social network 260. In particular embodiments, a game engine can access in-game social network 260, out-of-game social network 250, or both.

In particular embodiments, the connections in a player's in-game social network 260 can be formed both explicitly (e.g., users must "friend" each other) and implicitly (e.g., system observes user behavior and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

In multiplayer online games, two or more players can play in the same game instance. Game play is asynchronous when the players do not play simultaneously in the game instance. In particular embodiments, synchronous game play between two players in the same game instance can be simulated from asynchronous game play by recording the game play of a first player in the game instance at a first time and replaying that game play during the game play of a second player in the game instance at a later time. In particular embodiments, the game engine can record the in-game actions of a first player in a game instance for later play-back by other players in the game instance, and then the game engine loads and executes the previously recorded in-game actions during the game play of other players in the game instance.

Example System

Figure 3:
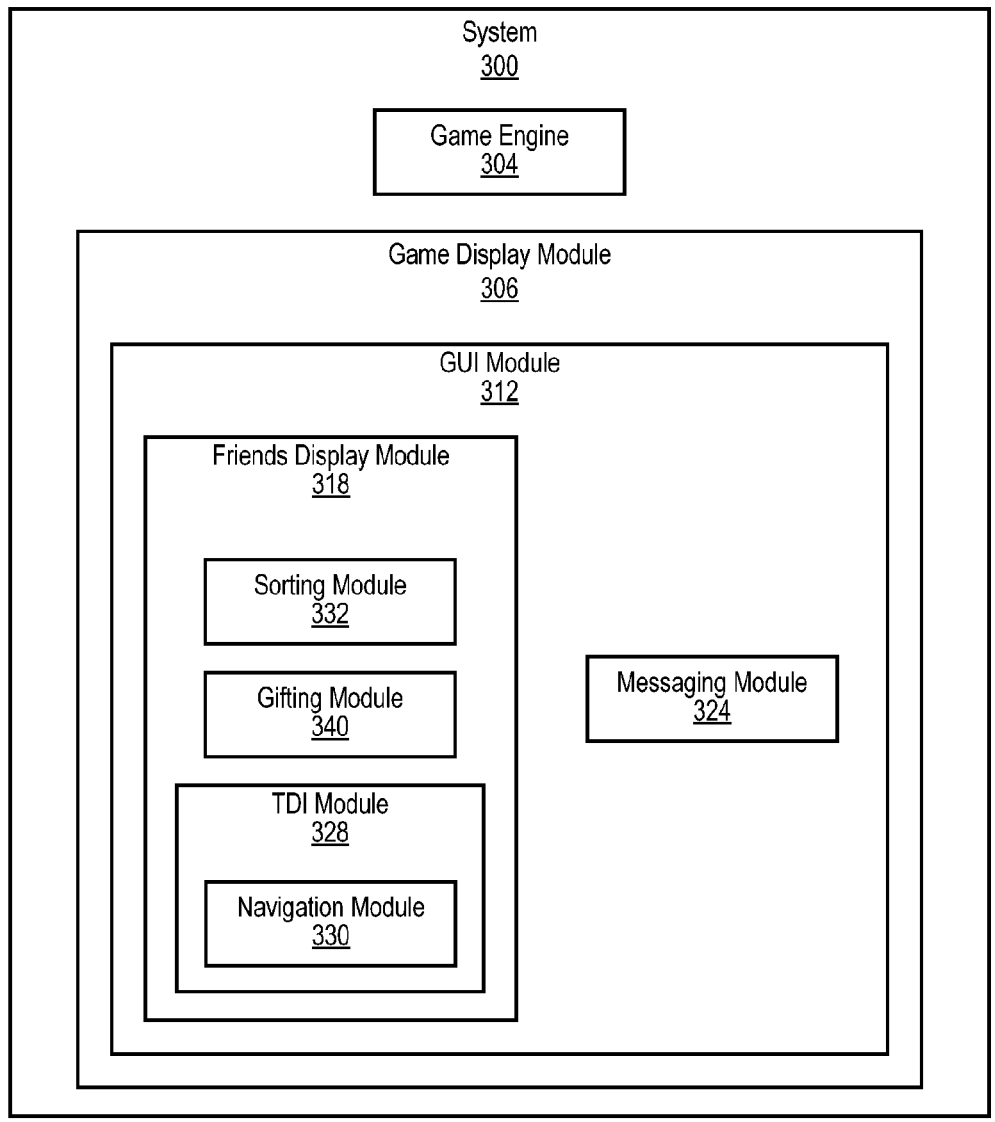
FIG. 3 illustrates an example system for implementing particular disclosed embodiments.

FIG. 3 illustrates an example system 300 for implementing particular disclosed embodiments. The system 300 may comprise a number of hardware implemented modules provided by one or more processors. The system 300 may include a game engine 304 to manage a multiplayer online game. To this end, the game engine 304 may include game logic to manage in-game objects and non-player character behavior, and to execute in-game actions responsive to user input. Although other illustrated modules of the system 300 are shown in FIG. 3 to be separate from the game engine 304, one or more of these modules may form part of the game engine module.

The system 300 may further include a game display module 306 to generate a game display for the computer-implemented game on a client system 130. The game display may be of a particular game instance associated with a particular player 101 (FIG. 1). The game display typically comprises an environment view that shows a virtual in-game environment of the particular game instance, and a graphical user interface to receive user input and to display game related information to the user.

To this end, the system 300 may include a graphical user interface (GUI) module 312 to generate a graphical user interface in the game display. The GUI may include a friends panel that provides friend information display functionality and/or friend communication functionality. The friends panel may be switchable between a friends display mode and a messaging mode. In the friends display mode, the friends panel displays information about multiple friend players in the in-game social network 260 and/or the out-of-game social network 250 of the player 101 (FIG. 2). For ease of description, the friend players are hereafter referred to as friends 221 (FIG. 2). In the messaging mode, the friends panel may provide messaging functionality for reading, composing, and sending messages to the friends 221. The system 300 may therefore comprise a friends display module 318 to generate and manage the friends panel in the friends display mode, and a messaging module 324 to generate and manage display of the friends panel in the messaging mode.

The friends display module 318 and the messaging module 324 may be configured to generate the friends panel such that it is operable between a collapsed condition in which the friends panel provides a provides a collapsed friends panel, and an expanded condition that provides an expanded friends panel occupying a larger area of the game display than the collapsed friends panel. Further aspects of these modules, in this example embodiment, will be evident from the description below with reference to FIGS. 5-7.

The system 300 may further include a sorting module 332 to automatically sort multiple friend cards associated with respective friends 221, thereby automatically to determine the sequence of friend cards displayed in any particular view of the friends panel in the friends display mode. A tabbed document interface (TDI) module 328 may further provide a TDI when the friends panel is in its expanded mode, the expanded friends panel thus including multiple friend cards arranged in groups according to the type or attributes of respective friends 221, the respective groups being accessible via corresponding tabs. A navigation module 330 may provide navigation functionality within each group of friend cards. The system 300 may yet further include a gifting module 340 to provide batch-sending of in-game gifts.

Functionality of the system 300 and its respective modules, in accordance with the example embodiment, is further described below with respect to example methods.

Example Methods

Figure 4:
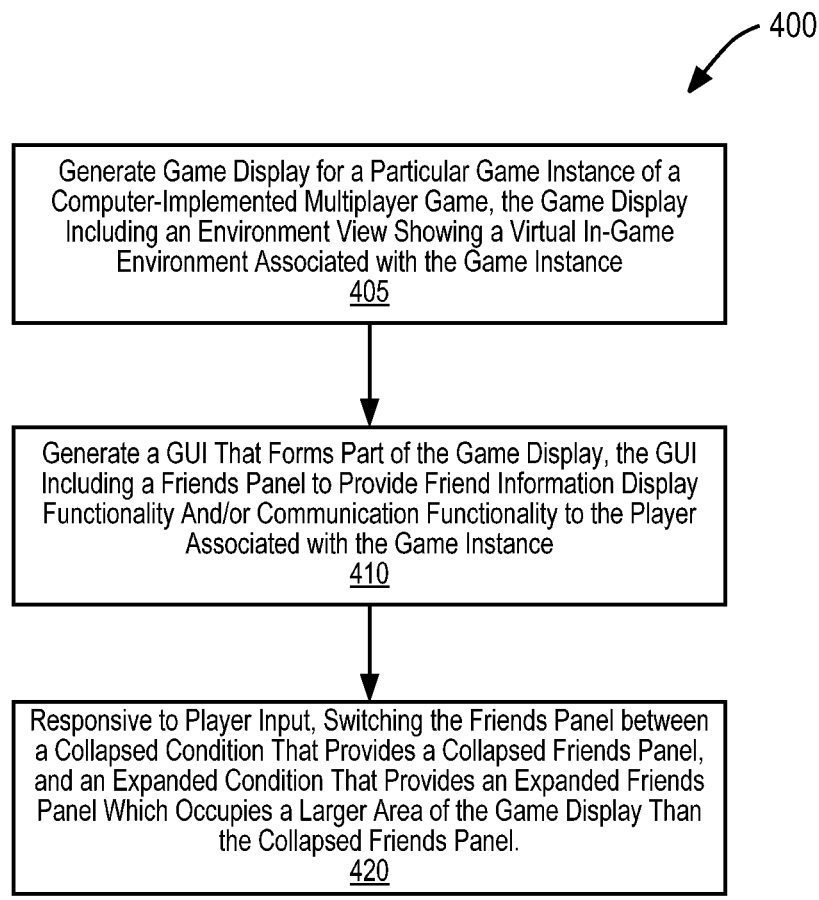
FIG. 4 illustrates an example method for implementing particular disclosed embodiments.

FIG. 4 shows a high-level flow chart of an example method 400 to host a computer-implemented multiplayer game. The method 400 may be implemented in one embodiment by example system 300, described above with reference to FIG. 3, in the game environment described with reference to FIGS. 1 and 2.

The method 400 comprises generating, at 405, a game display for a particular game instance of a computer-implemented multiplayer game, the game display including an environment view that shows a virtual in-game environment associated with the game instance (see, e.g., FIG. 6A). A GUI forming part of the game display may be generated, at 410, to provide friend information display functionality and/or communication functionality to the player 101 associated with the game instance.

Figure 7B:
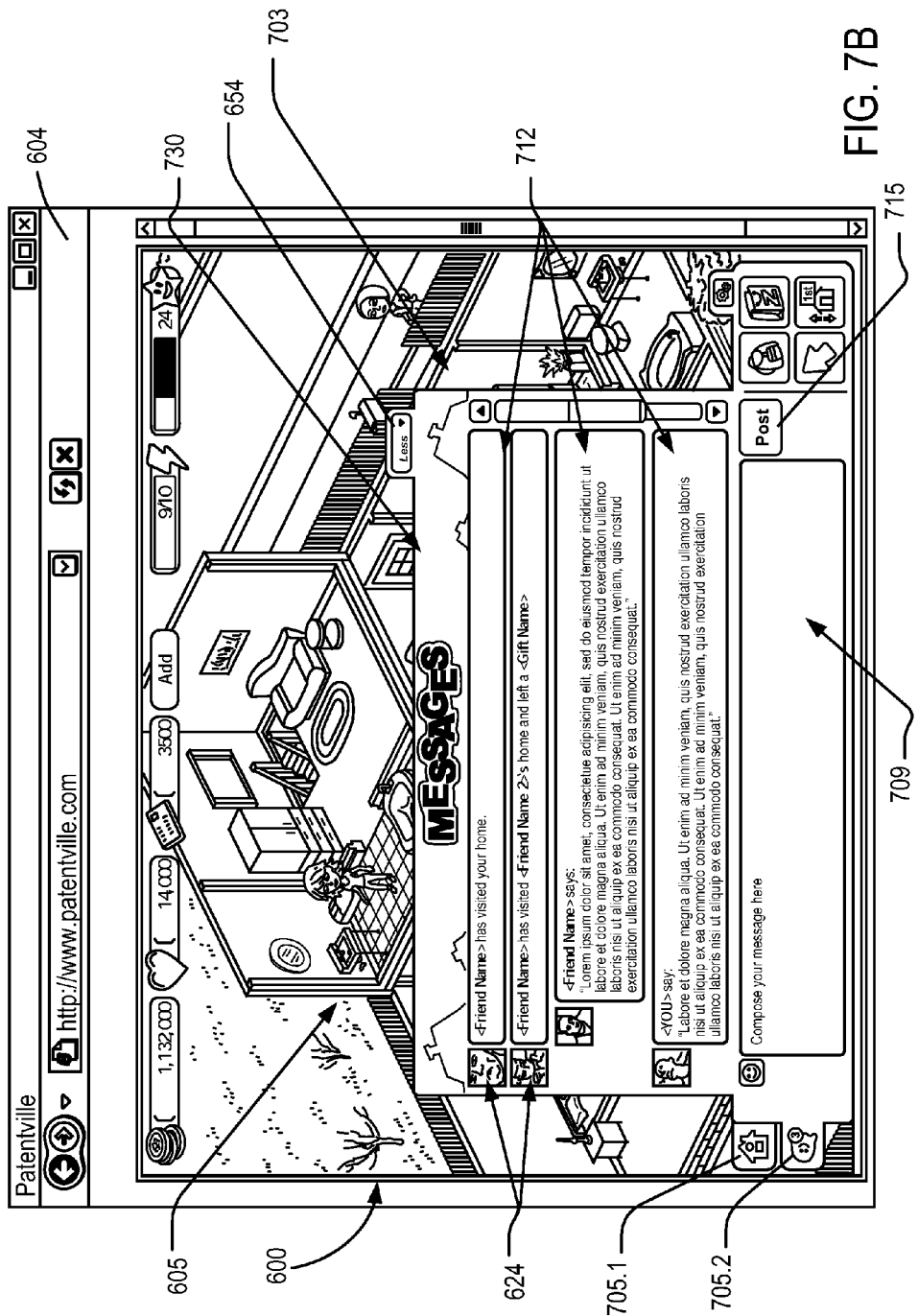
Figure 7C:
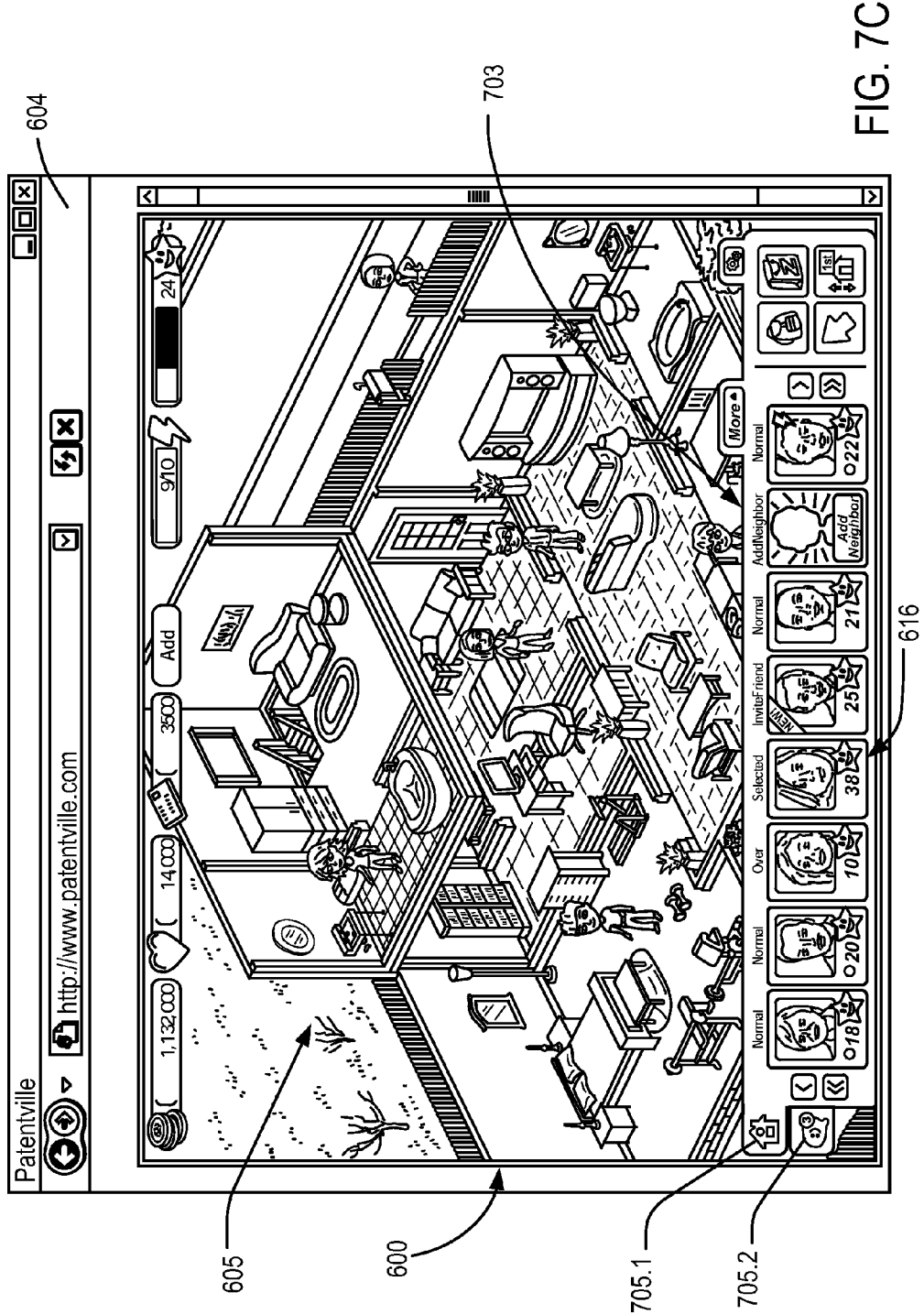
Figure 7D:
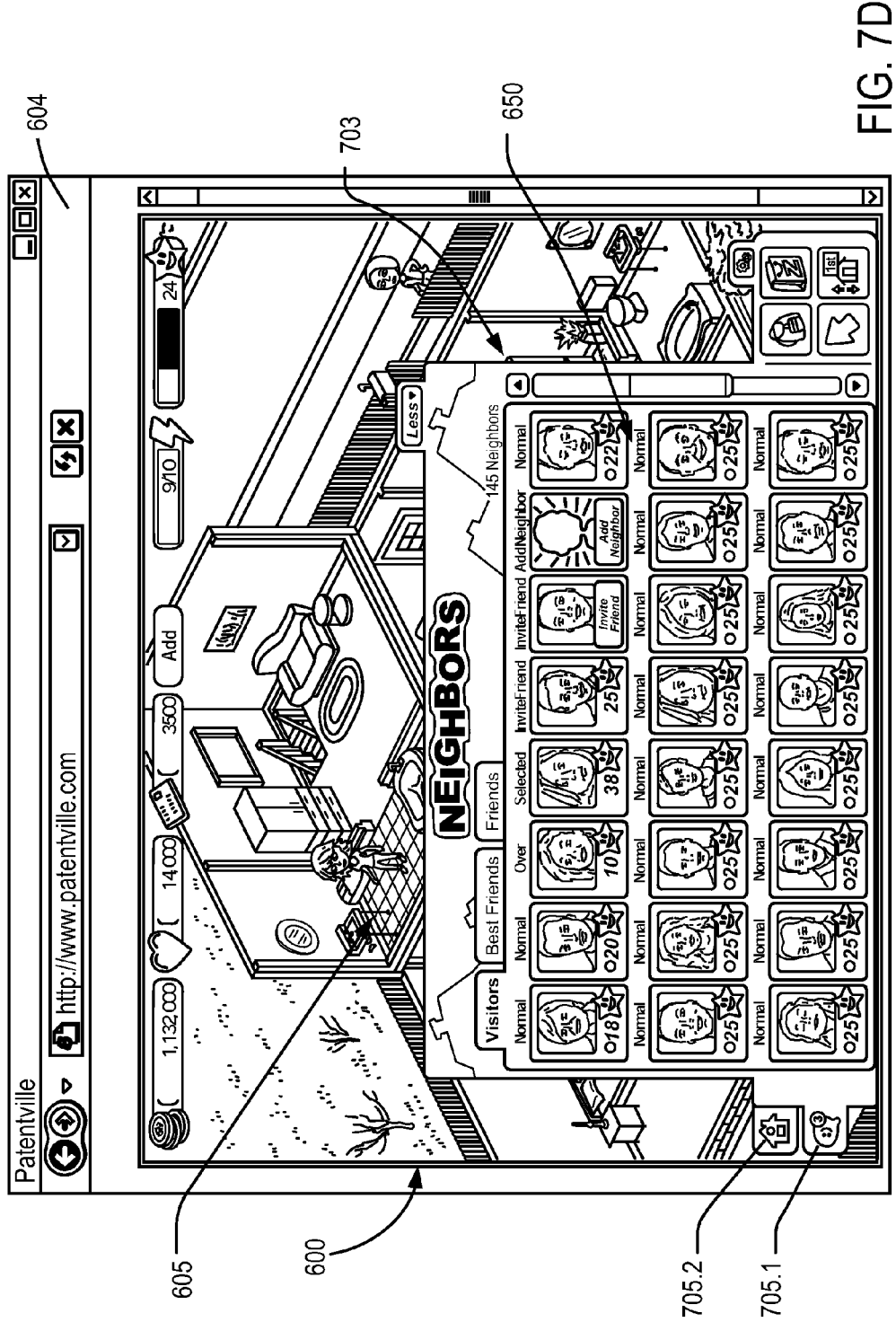

Responsive to player input, the friends panel may be switched between a collapsed condition that provides a collapsed friends panel (see, e.g., FIG. 6A, 7A, or 7C), and an expanded condition that provides an expanded friends panel which occupies a larger area of the game display than the collapsed friends panel (see, e.g., FIGs. 6B, 7B, or 7D). Both the collapsed friends panel and the expanded friends panel provides user-accessible friend information display functionality and/or friend communication functionality, such as messaging functionality, to the player 101.

Figure 5:
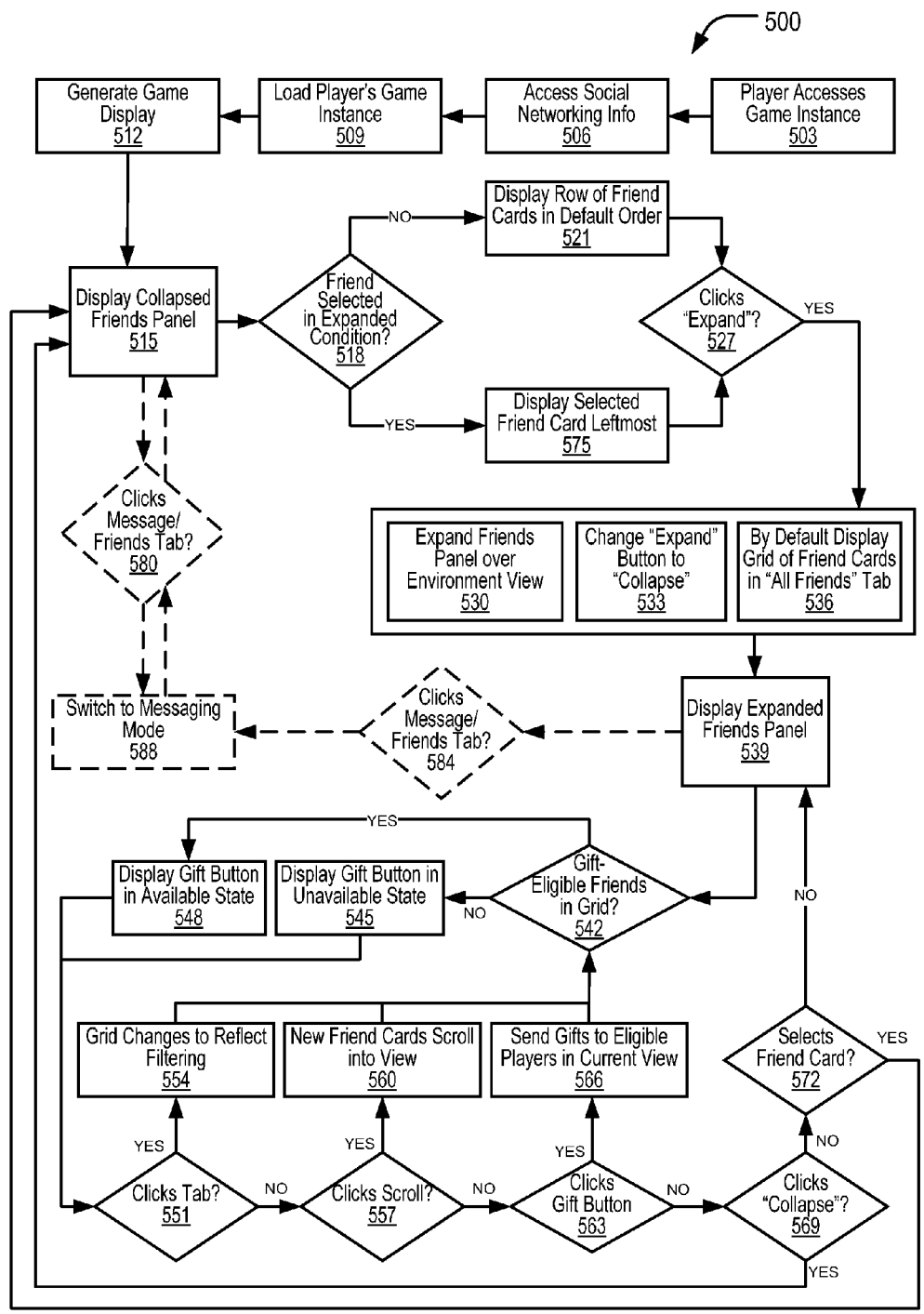
FIG. 5 illustrates another example method for implementing particular disclosed embodiments.

FIG. 5 shows a more detailed flowchart of a method 500 for implementing particular disclosed embodiments. The method 500 may be implemented in one embodiment by example system 300, described above with reference to FIG. 3, in the example game environment described with reference to FIGS. 1 and 2.

At operation 503, the player 101 (FIG. 1) may access a game instance that is associated with him/her. The player 101 may, for example, access a multiplayer online game on game networking system 150, social networking system 140, or both (FIG. 1). In this example embodiment, and not by way of limitation, the player 101 may access, via client system 130 (FIG. 1), a webpage hosted by social networking system 140, wherein the webpage has an embedded game interface hosted by the game networking system 150. In such a case, the system 300 providing the game engine 304 (FIG. 3) may be provided by the game networking system 150. In other embodiments, the game engine 304 may be provided by or installed on the client system 130.

Social networking information associated with the player 101 may thereafter be accessed, at operation 506. In particular embodiments, social networking information on the social networking system 140, the game networking system 150, or both may be accessed. As an example, and not by way of limitation, the player 101 may have an out-of-game social network 250 on social networking system 140 and an in-game social network 260 on the game networking system 150, wherein the in-game social network 260 is a subset of the player 101's first-degree friends in out-of-game social network 250 (see, for example, FIG. 2). In some embodiments, game instances can be selected from a set of game instances associated with the player 101's friends 221 (FIG. 2) in the relevant social network. Here, the player 101 selects the game instance uniquely associated with him/her.

The game engine 304 may thereafter load the player 101's game instance, at 509, and may generate a game display for the selected game instance, at 512. FIG. 6A shows an example embodiment of a game display 600 generated within a browser window 604 on the client system 130. The game display 600 includes an environment view that shows a visual representation of a virtual in-game environment of the game instance. In this example, the online RPG simulates a residential environment in which the game instance of each player comprises a virtual house 605. Player characters can interact and perform predefined actions in their own game instances and in the game instances of other players to whose game instances they have access, in order to increase in-game scores, achieve in-game rewards, and increase in-game experience levels or points. This disclosure, however, contemplates any suitable multiplayer game.

Once the game display 600 has been generated, at 512, the player 101 may perform one or more in-game actions to one or more in-game objects in the game instance, or with respect to the player characters of friends 221. The player 101 is represented in the virtual environment of the game instance by a player character in the form of an avatar 612 (FIG. 6A) that is controlled by the player 101.

Generation of the game display 600, at 512, includes generating a graphical user interface (GUI) 606 to receive user input and to provide interactive information display to the player 101. The GUI 606 includes a friends panel that is operable between a collapsed condition (FIG. 6A) and an expanded condition (FIG. 6 B). In the collapsed condition shown in FIG. 6A the collapsed friends panel, in this example, provides a friends bar 616 that includes a single row of friend cards 620.*n*. Each friend card 620.*n* displays information regarding a particular corresponding friend 221 of the player 101. In this example, each friend card 620.*n* is a rectangular chiclet that includes an image 624 of the corresponding friend 221, together with in-game score, experience level, and/or status indicators 628. The friend card image 624 may be a profile picture of the respective friend 221, and may, in some embodiments, be a current active profile picture of the friend in the social networking system 140 (FIG. 1). Note that, in some embodiments, the friend cards 620.*n* may be selected first from the out-of-game network 250 and the in-game network 260, while, in other embodiments, the friend cards 620.*n* may be selected from only the in-game social network 260.

The friend cards 620.*n* are GUI elements and function as soft buttons, being applicable to select the associated friends 221 for performance of a particular action by the player 101 with respect to the selected friend 221. The friends bar 616 may also include one or more filler cards 632 that can be selected to initiate a process for adding new friends 221 to the player 101's in-game social network 260. The total number of friend cards 620.*n* that may be displayed simultaneously in the friends bar 616 is limited by the relevant dimension of the browser window 604, in this example being limited by the width of the browser window 604. The friends bar 616, however, includes scroll buttons 636 to effect scrolling of the row of friend cards 620.*n* in order to access friend cards 620.*n* that are currently out of view.

The default condition of the friends panel in this example embodiment is the collapsed condition (the friends bar 616) and the method 500 may therefore comprise displaying the collapsed friends panel in the example form of the friends bar 616, at operation 515, immediately after the initial loading of the game display 600. The friends bar 616 may occupy a peripheral area of the game display 600, in this example being located along a lower horizontal edge of the browser window 604. The friends bar 616 is therefore clear of the environment view and allows substantially unobstructed viewing of and access to the virtual house 605.

It is thereafter determined, at 518, whether or not display of the friends bar 616, at 515, was immediately preceded by selection of a particular friend card 620.*n* while the friends panel was in its expanded condition. When the game display 600 is initially loaded, the determination at 518 will be in the negative, and the row of friend cards 620.*n* is displayed, at 521, in default order.

The friends bar 616 may include a GUI element to toggle the friends panel between its expanded and collapsed conditions, in this example comprising an expansion chiclet 640 that forms part of the friends bar 616. Responsive to determining that the player 101 has clicked the expansion chiclet 640 at 527, the friends bar 616 is expanded upwards to display an expanded friends panel 650 (see FIG. 6B), at 539. Displaying the expanded friends panel 650 comprises expanding the friends panel over the environment view of the game instance at 530, so that a large portion the virtual house 605 is obscured by the expanded friends panel 650. The expanded friends panel 650 therefore occupies a significantly larger portion of the screen area of the game display 600 than is the case with the friends bar 616, and may in some embodiments obscure a majority of the environment view. Animated or automated gameplay may continue in the virtual in-game environment while the expanded friends panel 650 is shown, although some animated action may naturally be obscured by the expanded friends panel 650. Transition of the friends panel from the friends bar 616 to the expanded friends panel 650 may be animated or smoothed, so that a horizontal upper edge of the friends bar 616 moves smoothly upwards to form the upper horizontal edge of the expanded friends panel 650, and creating the visual impression is that the expanded friends panel 650 is drawn up out of the friends bar 616, drawer-fashion.

The expanded friends panel 650 may comprise a grid of friend cards 620.*n* that may comprise a plurality of horizontally arranged rows of friend cards 620.*n*. The system 300 may be configured to display a full grid of cards at all times. To this end, filler cards 632 may be added into a grid view having too few friend cards 620.*n* associated with actual in-game friends 221. As used herein, the term "friend cards" includes the filler cards 632. The positions of the filler cards 632 in the grid may be randomized. To promote continuity in display, and to facilitate ready location by the player 101 of specific friend cards 620.*n*, an uppermost row of the grid of friend cards 620.*n* in the expanded friends panel 650 may, in some embodiments, be identical to the row of friend cards 620.*n* that were immediately previously displayed in the friends bar 616. Transition from the friends bar 616 to the expanded friends panel 650 may also include changing the expansion chiclet 640 (FIG. 6A) to a collapse chiclet 654 (FIG. 6B) at 533.

The GUI 606 may provide a tabbed document interface (TDI) in the expanded friends panel 650. To this end, different groups of friend cards 620.*n* may be arranged in respective pages that are accessible by selection of corresponding tabs 658.*n*. In this example, the friend cards 620.*n* are arranged in groups comprising: all the friends 221 of the player 101 (accessible via an "All Friends" tab 658.1); currently active friends 221 (accessible via an "Active Friends" tab 658.2; and players who have visited the player 101's game instance (accessible via a "Visitors" tab 658.3). As used herein, the term "friend" therefore includes players whose player characters visit or have visited a particular game instance associated with the player 101. Note that the respective groups of friend cards 620.*n* shown in the respective data pages may be subsets or supersets of one another. For example, the "Active Friends" tab 658.2 may show friend cards 620.*n* that are all also included in the "All Friends" tab 658.1. In this example, the GUI module 312 (FIG. 3) is configured initially to display, at operation 536, the "All Friends" tab 658.1, by default. The availability of a particular tab 658.*n* and its associated grid may be conditional upon the corresponding group's membership exceeding a threshold value. Thus, for example, the "Visitors" tab 658.3 may be available for selection only when the current number of friends 221 who are visitors exceeds the threshold value, for example, 10. In some embodiments, an unavailable tab 658.*n* may be grayed out, but, in this embodiment, unavailable tabs 658.*n* are not shown in the expanded friends panel 650.

Each group of friend cards 620.*n* may further be navigated, for example by use of scroll buttons 636 included in the TDI of the expanded friends panel 650, if the total number of friend cards 620.*n* in the respective group exceeds the maximum number of friend cards 620.*n* that can be displayed at a time in the grid of the expanded friends panel 650. Scrolling of the grid of friend cards 620.*n* may be by shifting of the grid one column at any time, or by shifting a whole grid at a time.

The expanded friends panel 650 may provide a batch communication functionality to simultaneously send communications to a plurality of the friends 221 which friend cards 620.*n* currently displayed in the friends bar 616 represent. One embodiment of such a batch communication functioning as an arrangement for sending gifts to friends 221 in a batch operation, is shown with reference to FIG. 6B. In this example, the expanded friends panel 650 includes a gifting button 664 to send a gift comprising an in-game benefit or object to a plurality of the friends 221 shown in the expanded friends panel 650 responsive to clicking the gifting button 664 once. The GUI module 312 may be configured to automatically show the gifting button 664 in an available state or an unavailable state, depending on whether or not a grid currently displayed by the expanded friends panel 650 includes the friend cards 620.*n* of any friends 221 who are currently eligible to receive gifts. The computer-implemented game may implement rules that place a cap on the number of gifts that any player may receive a call and/or within a predefined time periods. When any of the friends 221 exceeds the cap or threshold value, that friends 221 is no longer eligible to receive gifts.

The method may therefore comprise, at 542, determining whether or not any of the friends 221 whose friend cards 620.*n* are currently displayed in the expanded friends panel 650 are eligible to receive a gift. If there are no gift-eligible friends in the currently displayed group, then the gifting button 664 is displayed in an unavailable state, at 545, for example, being grayed out. If, on the other hand, there are one or more gift-eligible friends 221 represented by the currently visible friend cards 620.*n*, then the gifting button 664 is shown in an available state, at 548.

The method may further comprise detecting input indicating that the player has clicked one of the tabs 658.*n* at 551, and in response thereto, changing the grid of friend cards 620.*n* displayed in that the expanded friends panel 650 to reflect filtering parameters associated with the selected tab 658.*n* at 554. For example, if the user, by a user input device such as a computer mouse, clicks on the "Active Friends" tab 658.2, a grid of friend cards 620.*n* constituting a first page of the subset of the player 101's friends 221 who are currently active friends would be displayed. In some example embodiments, users may create custom tabs 658.*n* that apply user-selected filtering criteria. Responsive to clicking on the scroll buttons 636, at 557, new friend cards 620.*n* may scroll into view, at 560. When it is determined, at 563, that the gifting button 664 has been clicked, the in-game gift may be sent to all gift-eligible players in the current view shown in the expanded friends panel 650. In embodiments where the friends 221 whose friend cards 620.*n* are displayed in the expanded friends panel 650 include player selected from the out-of-game social network 250, the method 500 may include determining whether or not a recipient list for the gift includes any friends 221 who are not whitelisted in the social networking system 140, and a whitelisting dialogue of the social networking system 140 may accordingly be displayed to allow the player 101 to whitelisted selected recipients.

Following display of a new tab 658.*n*, at 554, scrolling of the grid view, at 560, or sending of the gift, at 566, the method 500 resumes at operation 542, to recalculate gift-eligibility of the currently shown friends 221.

When the player 101 clicks on the collapse chiclet 654, at operation 569, the friends panel reverts to its collapsed condition, and the friends bar 616 is displayed, at 515. The selection and arrangement of the friend cards 620.*n* displayed in the collapsed friends bar 616 may be affected by intermediate navigation actions. Navigation actions such as scrolling through different views and selecting different tabs 658.*n* in the expanded friends panel 650 do not affect the sorting of the friend cards 620.*n* displayed in the friends bar 616. Such navigation actions exclude the selection of friend cards 620.*n* in the expanded friends panel 650, since selection of a particular friend card 620.*n* affects the position of that friend card 620.*n* in the subsequent friends bar 616. If the friends bar 616 is therefore expanded, and various navigation actions are thereafter performed in the expanded friends panel 650 without selecting a particular friend card 620.*n*, the friends bar 616 that is displayed upon collapse of the expanded friends panel 650 may show a row of friend cards 620.n that is identical to the row of friend cards 620.n that were displayed in the friends bar 616 before expansion. Certain navigation actions, such as, for example, tab choices in the expanded friends panel 650 may, however, persist. If, e.g., the expanded friends panel 650 is collapsed while the "Active Friends" tab 658.2 is selected, subsequent expansion of the friends bar 616 to the expanded friends panel 650 will display the grid of the "Active Friends" tab 658.2.

The friends bar 616 may likewise be displayed, at 515, responsive to selection of a particular friend cards 620.n by the player 101, at 572, for example by clicking on the selected friend card 620.n, the friend cards 620.n serving as soft buttons for selection of the corresponding friends 221. When collapse of the expanded friends panel 650 is responsive to player selection of a friend card 620.n, the determination, at 518, will be in the positive, and the selected friend card 620.n may be displayed in a position of prime prominence. In this example embodiment, the position of prime prominence in the friends bar 616 (FIG. 6A) is the leftmost position in the row of friend cards 620.n, the leftmost friend card 620.1 having been selected in an immediately preceding iteration of the expanded friends panel 650.

Note that the content displayed in the GUI 606 is uniquely associated with the player 101, so that the GUI 606 may remain constant even if the player 101 accesses another game instance.

Another example embodiment is shown with reference to FIG. 7, with like numerals indicating like elements in FIG. 6 and FIG. 7, unless otherwise indicated. The example embodiment described with reference to FIG. 7 comprises a GUI 703 (FIG. 7A) having a friends panel that provides not only the friend information display functionality described with reference to FIG. 6A-6B, but also provides messaging functionality. The friends panel may thus be operable between, on the one hand, a friends display mode in which it can be switched between a friends bar 616 (FIG. 7C) and an expanded friends panel 650 (FIG. 7D), and, on the other hand, a messaging mode in which it can be switched between a collapsed condition in which it provides a message bar 706 (FIG. 7A), and an expanded condition in which the friends panel provides an expanded message panel 730 (FIG. 7B).

In the collapsed condition, the message bar 706 shown in FIG. 7A, one or more message panes 712 are shown, in which messages from respective friends 221 may be displayed. The number of message panes 712 (and therefore the number of messages) displayed in the message bar 706 may automatically vary depending on the available space in the message bar 706 and the length of the associated messages. In the example embodiment shown in FIG. 7A, a single message pane 712 is displayed in the message bar 706. In other embodiments, no more than one message pane 712 may at any time be displayed in the message bar 706.

The message bar 706 may further include a message entry interface, in this example being a text entry box 709 in which a message can be posted by the player 101 via a text input device, such as a keyboard or a speech recognition facility. Messages entered into the text entry box 709 may be sent by clicking a soft button (in this example post button 715) provided as a GUI element in the message bar 706.

Responsive to player-selection of the expansion chiclet 640, the friends panel may be switched to its expanded condition in which it provides the expanded message panel 730 (FIG. 7B). The message bar 706 expands in size to increase the available area for display of messages. Similar to expansion of the friends bar 616 described with reference to FIG. 6B, the message bar 706 may expand from the peripheral area in which it allows unobscured view of the environment view (e.g. the house 605), over at least a significant part of the environment view, in this example expanding upwards.

In this example embodiment, the message bar 706 (FIG. 7A) does not include images identifying authors of the respective messages, while the expanded message panel 730 (FIG. 7B) includes profile picture images 624 associated with the respective messages. The text entry box 709 in the expanded message panel 730 may be larger than it is in the message bar 706, and post button 715 may likewise be enlarged. The message panes 712 selected for display in the expanded message panel 730 may comprise a discussion thread, and the expanded message panel 730 may include a GUI scrolling element in the form of a vertical scroll bar and scroll buttons to enable vertical scrolling through all of the messages in a particular discussion thread or message group that does not fit into a single view of the expanded message panel 730.

The GUI 703 further comprises GUI elements to allow switching of the friends panel between its messaging mode and its friends display mode, in this example comprising a pair of tabs in the form of a friends tab 705.1 and a message tab 705.2. Returning briefly to FIG. 5, some additional operations of the method 500 that may be included in embodiments wherein the friends panel includes a messaging mode (e.g. implemented by a messaging module 324 in system 300 (FIG. 3)) are shown in broken lines in the FIG. 5.

For example, when the friends bar 616 is displayed, at 515, player selection of the messaging tab 705.n, at 580, results in switching of the friends panel to the messaging mode, at operation 588, and display of the message bar 706. In this example, as will be noted from a comparison of FIG. 7A and FIG. 7C, the message bar 706 and the friends bar 616 occupy an identical area in the game display 600, creating the impression that only the content of the friends panel changes by clicking the tabs 705.n. If the friends bar 616 is thereafter clicked, at 580, the friends bar 616 is again displayed at 515. The mode switching tabs 705.n may be available both in the collapsed condition and the expanded condition of the friends panel both in its messaging mode and its friends display mode. As can be seen with reference to FIGS. 7A-7D, the mode switching tabs 705.n are visible and located in a constant position in the friends bar 616 (FIG. 7A), in the expanded message panel 730 (FIG. 7B) in the friends bar 616 (FIG. 7C), and in the expanded friends panel 650 (FIG. 7D).

When the message tab 705.2 is selected, at 584 (FIG. 5), while the expanded friends panel 650 is displayed, the friends panel may be switched to the messaging mode, at 588. When the friends panel is in the messaging mode, at 588, it may selectively be returned to the friends display mode by player selection of friends tab 705.1, at 580. In this example embodiment, player selection of the message tab 705.2 results in display of the friends panel in its collapsed condition (e.g., the message bar 706) regardless of the previous condition of the friends panel. Thus, the message bar 706 (as opposed to the expanded message panel 730) may be displayed when switching from the friends bar 616, and when switching from the expanded friends panel 650. Switching to the friends display mode may likewise result in display of the friends bar 616, regardless of whether the friends tab 705.1 is clicked in the message bar 706 or in the expanded message panel 730. In other embodiments, switching between the messaging mode and the friends display mode may be performed while retaining the expanded condition of the friends panel, so that switching to the messaging mode from the expanded friends panel 650 results in display of the expanded message panel 730, and/or vice versa.

Therefore, the example embodiments describe a method that comprises generating a game display for a game instance of a computer-implemented multiplayer game, the game display being associated with a player of the game and including an environment view that shows a virtual in-game environment associated with the game instance; generating a graphical user interface that forms part of the game display, the graphical user interface including a friends panel that is operable between, on the one hand, a collapsed condition that provides a collapsed friends panel, and, on the other hand, an expanded condition that provides an expanded friends panel which occupies a larger area of the game display than the collapsed friends panel, both the collapsed friends panel and the expanded friends panel providing friend information display functionality and/or friend communication functionality to the player. The friends panel may be switched between the collapsed condition and the expanded condition responsive to player input.

Another aspect of the example embodiment is a system to implement the method, comprising a game display module to generate a game display and a graphical user interface to generate the graphical user interface.

The friends panel may further be operable between a friends display mode in which it displays information about multiple friends of the player, and a messaging mode in which it provides messaging functionality to the player, the method further comprising switching the friends panel between the display mode and the messaging mode responsive to player input.

The collapsed friends panel may occupy a constant peripheral area of the game display, to allow unobscured visual access to the environment view (for example comprising a horizontally extending elongated bar at a bottom edge of a window within which the game display is provided), while the expanded friends panel occupies an expanded area that includes the peripheral area and obscures a majority of the environment view.

The collapsed friends panel and the expanded friends panel may each display multiple friend cards that respectively show information about corresponding friends of the player (for example including avatars or images associated with the friends), the expanded friends panel displaying a greater number of friend cards than the collapsed friends panel. The collapsed friends panel may, for example, comprise a friends bar that displays a single row of friend cards, while the expanded friends panel may comprise a grid of friend cards. The size of the grid of friend cards in the expanded friends panel may be automatically variable dependent on the available screen size. The system may thus be configured to automatically determine a size of the grid of friend cards based on an available screen area for the expanded friends panel in the game display.

The friend cards may be GUI elements capable of receiving user input, the friend cards, for example, providing chiclets or soft buttons that can be clicked or selected with a user input device. The method may comprise switching from the expanded friends panel to the collapsed friends panel responsive to selection by the player of a particular friend card in the expanded friends panel. The selected friend card may automatically be displayed in a position of prime prominence in the collapsed friends panel immediately subsequent to its selection in the expanded friends panel. Note that the position of prime prominence may vary depending on the layout of the friend cards in the collapsed friends panel. For example, when the collapsed friends panel is a horizontally extending or comprising a horizontal row of friend cards, the position of prime prominence may be the leftmost position in the row. In embodiments, however, where the collapsed friends panel comprises a vertically extending bar showing a vertical row of cards, the position of prime prominence may be the topmost friend card. Instead, or in addition, the selection and arrangement of friend cards displayed in the collapsed friends panel may automatically be determined based on criteria that exclude any intermediate navigation actions performed in the expanded friends panel. Such navigation actions may include, for example, scrolling through pages of friend's cards, via different tabbed pages, or performing messaging actions. Selection of a friend card in the expanded friends panel is, however, not considered to constitute a navigation action.

The expanded friends panel may comprise a plurality of pages of friend cards that are navigable responsive to player input to display one page of friend cards at a time. Each page of friend cards may, for example, be a grid of friend cards. Instead, or in addition, the expanded friends panel comprises a plurality of groups of friend cards that are grouped by type and/or status of the respective friends. The expanded friends panel may provide a tabbed document interface that provides a tab corresponding to each group, the expanded friends panel displaying at least a subset of a particular one of the plurality of groups responsive to player selection of the corresponding tab. Display of a tab for at least one of the plurality of groups may be conditional upon members of the at least one group exceeding a threshold value, so that a particular group or subset of friends are only available in the tabbed document interface if the members of the associated group or subset of friends is large enough. The method may therefore comprise determining that the number of friend cards in the at least one group exceeds the threshold value, and based on the determination, displaying the corresponding tab. The plurality of groups of friend cards are directly accessible only in the expanded friends panel, but not in the collapsed friends panel.

The expanded friends panel may therefore provide augmented functionality relative to the collapsed friends panel, in that at least some friends display, friend selection, friends management, gifting, and/or messaging functionality is directly available in the expanded friends panel, but cannot be used directly from the collapsed friends panel.

The graphical user interface (GUI) further comprises a batch send GUI element (such as a soft button, chiclet, or icon) that can be selected or limited by the player to send a batch communication to a plurality of players. In one embodiment, gifts are sent in the batch only to friends whose friend cards are displayed in the expanded friends panel (and who are otherwise eligible to receive the relevant gift) when the batch send GUI element is selected. In other embodiments, the batch gift may be sent to all eligible friends, or to all eligible friends in a particular group or subset that is currently viewed, regardless of the identity of currently displayed friend cards. The batch send GUI element may automatically switch between an available state and an unavailable state depending on whether or not selection of the batch send GUI element will result in sending of the gift to any friends. The system may thus be configured to switch the batch send GUI element to the unavailable state responsive to determining that a total number of friend players whose friend cards are currently displayed in the expanded friends panel and who are eligible to receive the batch communication is lower than a threshold value. In some instances, the threshold value is one, while in other embodiments a larger threshold value may be employed.

It is a benefit of the example embodiments described above that it provides a graphical user interface in a computer-implemented game that promotes effective use of available screen area, while providing ready access by a player of the game to various functionalities. When the friends panel is in its collapsed condition, the environment view in the game display is unobscured by friend display information, friend messaging information, friend selection widgets, and/or friend messaging widgets. Core functionalities with respect to, e.g., the viewing of friend information, managing of friend networks, selection of friends, and friend messaging are nevertheless conveniently available from the friends panel in its collapsed condition (e.g., the friends bar 616 and/or the message bar 706).

When, however, the player wishes to focus on friend network management or messaging, the friends panel can be switched to its expanded condition in which additional functionalities are available and increased screen space is dedicated to the display of friends information and/or messaging.

Data Flow

Figure 8:
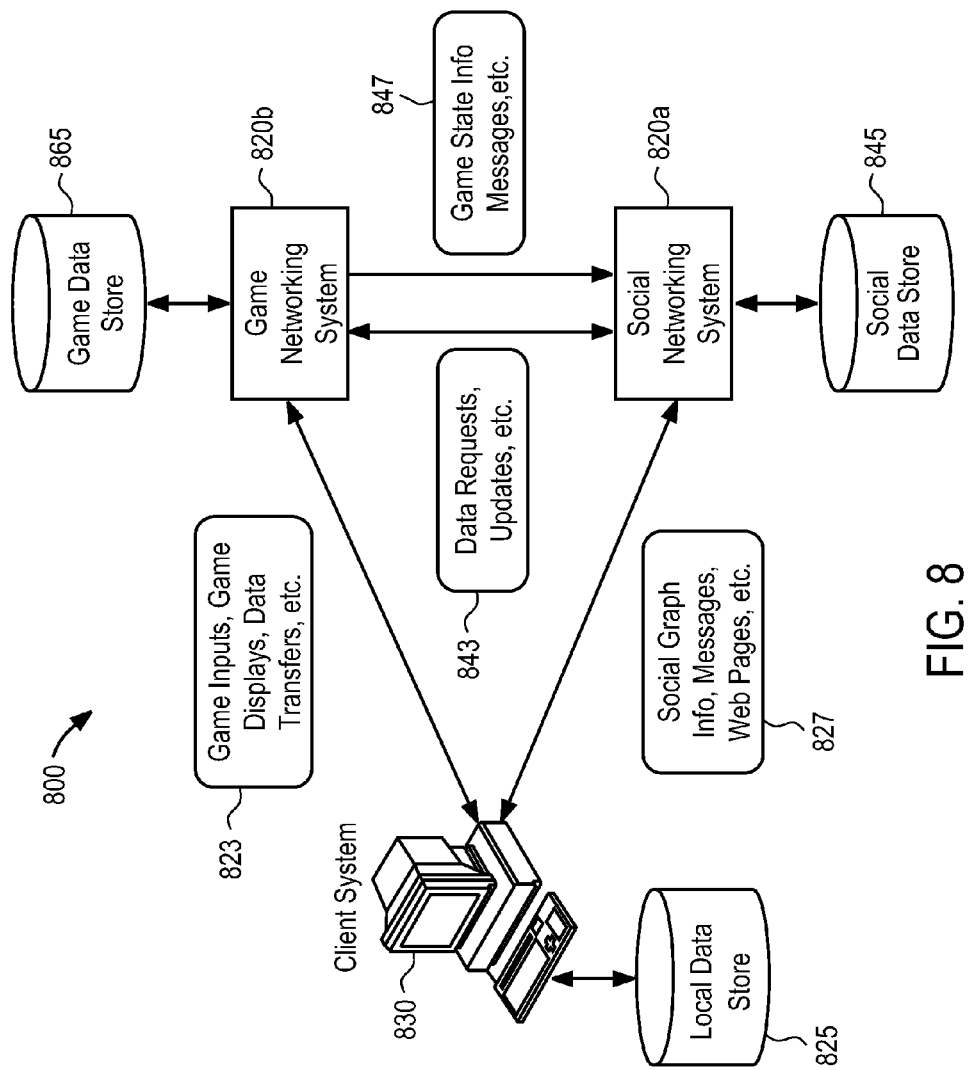
FIG. 8 illustrates an example data flow in a system.

FIG. 8 illustrates an example data flow between the components of an example system 800. In particular embodiments, system 800 can include client system 830, social networking system 820a, and game networking system 820b. A system 300 such as that described with reference to FIG. 3 may be provided by the client system 830, the social networking system 820a, or the game networking system 820b, or by any combination of these systems. The components of system 800 can be connected to each other in any suitable configuration, using any suitable type of connection. The components may be connected directly or over any suitable network. Client system 830, social networking system 820a, and game networking system 820b can each have one or more corresponding data stores such as local data store 825, social data store 845, and game data store 865, respectively. Social networking system 820a and game networking system 820b can also have one or more servers that can communicate with client system 830 over an appropriate network. Social networking system 820a and game networking system 820b can have, for example, one or more Internet servers for communicating with client system 830 via the Internet. Similarly, social networking system 820a and game networking system 820b can have one or more mobile servers for communicating with client system 830 via a mobile network (e.g., GSM, PCS, Wi-Fi, WPAN, etc.). In some embodiments, one server may be able to communicate with client system 830 over both the Internet and a mobile network. In other embodiments, separate servers can be used.

Client system 830 can receive and transmit data 823 to and from game networking system 820b. This data can include, for example, webpages, messages, game inputs, game displays, HTTP packets, data requests, transaction information, updates, and other suitable data. At some other time, or at the same time, game networking system 820b can communicate data 843, 847 (e.g., game state information, game system account information, page info, messages, data requests, updates, etc.) with other networking systems, such as social networking system 820a (e.g., Facebook, Myspace, etc.). Client system 830 can also receive and transmit data 827 to and from social networking system 820a. This data can include, for example, webpages, messages, social graph information, social network displays, HTTP packets, data requests, transaction information, updates, and other suitable data.

Communication between client system 830, social networking system 820a, and game networking system 820b can occur over any appropriate electronic communication medium or network using any suitable communications protocols. For example, client system 830, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as HTTP, other communications protocols, such as HTTP-S, FTP, SNMP, TELNET, and a number of other protocols may be used. In addition, a server in one interaction context may be a client in another interaction context. In particular embodiments, the information transmitted between hosts may be formatted as HyperText Markup Language (HTML) documents. Other structured document languages or formats can be used, such as XML and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called binary large object (BLOB). When a player accesses an online game on game networking system 820b, the BLOB containing the game state for the instance corresponding to the player can be transmitted to client system 830 for use by a client-side executed object to process. In particular embodiments, the client-side executable may be a Flash-based game, which can de-serialize the game state data in the BLOB. As a player plays the game, the game logic implemented at client system 830 maintains and modifies the various game state parameters locally. The client-side game logic may also batch game events, such as mouse clicks, and transmit these events to game networking system 820b. Game networking system 820b may itself operate by retrieving a copy of the BLOB from a database or an intermediate memory cache (memcache) layer. Game networking system 820b can also de-serialize the BLOB to resolve the game state parameters and execute its own game logic based on the events in the batch file of events transmitted by the client to synchronize the game state on the server side. Game networking system 820b may then re-serialize the game state, now modified, into a BLOB, and pass this to a memory cache layer for lazy updates to a persistent database.

With a client-server environment in which the online games may run, one server system, such as game networking system 820b, may support multiple client systems 830. At any given time, there may be multiple players at multiple client systems 830 all playing the same online game. In practice, the number of players playing the same game at the same time may be very large. As the game progresses with each player, multiple players may provide different inputs to the online game at their respective client systems 830, and multiple client systems 830 may transmit multiple player inputs and/or game events to game networking system 820b for further processing. In addition, multiple client systems 830 may transmit other types of application data to game networking system 820b.

In particular embodiments, a computed-implemented game may be a text-based or turn-based game implemented as a series of web pages that are generated after a player selects one or more actions to perform. The web pages may be displayed in a browser client executed on client system 830. As an example and not by way of limitation, a client application downloaded to client system 830 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a Small Web Format (SWF) object that is embedded in a web page and executable by a Flash media player plug-in. In particular embodiments, one or more described webpages may be associated with or accessed by social networking system 820a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 830, either caused by an action of a game player or by the game logic itself, client system 830 may need to inform game networking system 820b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 800 is discussed in reference to updating a multi-player online game hosted on a network-addressable system (such as, for example, social networking system 820a or game networking system 820b), where an instance of the online game is executed remotely on a client system 830, which then transmits application event data to the hosting system such that the remote game server synchronizes the game state associated with the instance executed by the client system 830.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 830 may include a Flash client. The Flash client may be configured to receive and run Flash application or game object code from any suitable networking system (such as, for example, social networking system 820a or game networking system 820b). In particular embodiments, the Flash client may be run in a browser client executed on client system 830. A player can interact with Flash objects using client system 830 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 830 and the game networking system 820b, the Flash client may send the events that caused the game state changes to the in-game object to game networking system 820b. However, to expedite the processing and hence the speed of the overall gaming experience, the Flash client may collect a batch of some number of events or updates into a batch file. The number of events or updates may be determined by the Flash client dynamically or determined by game networking system 820b based on server loads or other factors. For example, client system 830 may send a batch file to game networking system 820b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 830. In particular embodiments, the batch file may be a text file and the name-value pairs may be in string format.

In particular embodiments, when a player plays an online game on client system 830, game networking system 820b may serialize all the game-related data, including, for example and without limitation, game states, game events, and user inputs, for this particular user and this particular game into a BLOB and store the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game that the player is in. When a player resumes playing the game next time, game networking system 820b may retrieve the corresponding BLOB from the database to determine the most-recent values of the game-related data. In particular embodiments, while a player is playing the online game, game networking system 820b may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have access to the retrieval and rendering of structured documents hosted by any type of network addressable resource or web site. Additionally, as used herein, a user may be an individual, a group, or an entity (such as a business or third party application).

Figure 9:
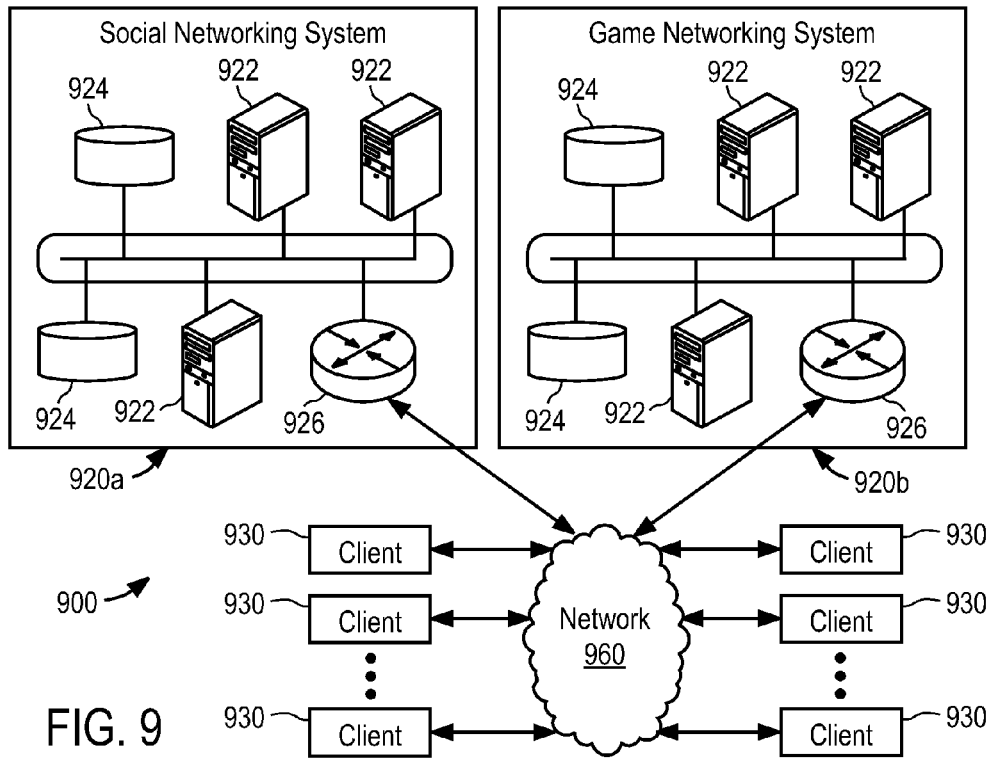
FIG. 9 illustrates an example network environment.

Particular embodiments may operate in a WAN environment, such as the Internet, including multiple network addressable systems. FIG. 9 illustrates an example network environment 900, in which various example embodiments may operate. Network cloud 960 generally represents one or more interconnected networks, over which the systems and hosts described herein can communicate. Network cloud 960 may include packet-based WAN (such as the Internet), private networks, wireless networks, satellite networks, cellular networks, paging networks, and the like. As FIG. 9 illustrates, particular embodiments may operate in a network environment comprising one or more networking systems, such as social networking system 920a, game networking system 920b, and one or more client systems 930. The components of social networking system 920a and game networking system 920b operate analogously; as such, hereinafter they may be referred to simply at networking system 920. Client systems 930 are operably connected to the network environment via a network service provider, a wireless carrier, or any other suitable means.

Networking system 920 is a network addressable system that, in various example embodiments, comprises one or more physical servers 922 and data stores 924. The one or more physical servers 922 are operably connected to network cloud 960 via, by way of example, a set of routers and/or networking switches 926. In an example embodiment, the functionality hosted by the one or more physical servers 922 may include web or HTTP servers, FTP servers, and, without limitation, webpages and applications implemented using Common Gateway Interface (CGI) script, PHP Hyper-text Preprocessor (PHP), Active Server Pages (ASP), HTML, XML, Java, JavaScript, Asynchronous JavaScript and XML (AJAX), Flash, ActionScript, and the like.

Physical servers 922 may host functionality directed to the operations of networking system 920. Hereinafter servers 922 may be referred to as server 922, although server 922 may include numerous servers hosting, for example, networking system 920, as well as other content distribution servers, data stores, and databases. Data store 924 may store content and data relating to, and enabling, operation of networking system 920 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, and the like. Logically, data store 924 corresponds to one or more of a variety of separate and integrated databases, such as relational databases and object-oriented databases that maintain information as an integrated collection of logically related records or files stored on one or more physical systems. Structurally, data store 924 may generally include one or more of a large class of data storage and management systems. In particular embodiments, data store 924 may be implemented by any suitable physical system(s) including components, such as one or more database servers, mass storage media, media library systems, storage area networks, data storage clouds, and the like. In one example embodiment, data store 924 includes one or more servers, databases (e.g., MySQL), and/or data warehouses. Data store 924 may include data associated with different networking system 920 users and/or client systems 930.

Client system 930 is generally a computer or computing device including functionality for communicating (e.g., remotely) over a computer network. Client system 930 may be a desktop computer, laptop computer, personal digital assistant (PDA), in- or out-of-car navigation system, smart phone or other cellular or mobile phone, or mobile gaming device, among other suitable computing devices. Client system 930 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 930 to enter addresses of specific network resources to be retrieved, such as resources hosted by networking system 920. These addresses can be uniform resource locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web browser-supported languages and technologies include XML, the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 930 desires to view a particular webpage (hereinafter also referred to as target structured document) hosted by networking system 920, the user's web browser, or other document rendering engine or suitable client application, formulates and transmits a request to networking system 920. The request generally includes a URL or other document identifier as well as metadata or other information. By way of example, the request may include information identifying the user, such as a user ID, as well as information identifying or characterizing the web browser or operating system running on the user's client computing device or system 930. The request may also include location information identifying a geographic location of the user's client system 930 or a logical network location of the user's client system 930. The request may also include a timestamp identifying when the request was transmitted.

Although the example network environment described above and illustrated in FIG. 9 is described with respect to social networking system 920a and game networking system 920b, this disclosure encompasses any suitable network environment using any suitable systems. As an example and not by way of limitation, the network environment may include online media systems, online reviewing systems, online search engines, online advertising systems, or any combination of two or more such systems.

Figure 10:
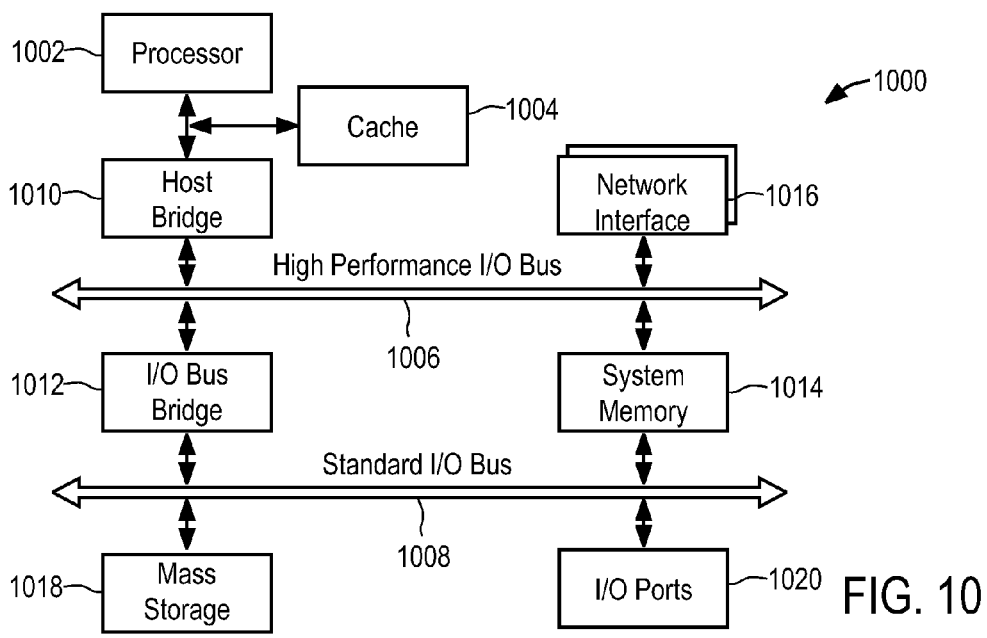
FIG. 10 illustrates an example computer system architecture.

FIG. 10 illustrates an example computing system architecture, which may be used to implement a server 922 or a client system 930 (FIG. 9). In one embodiment, hardware system 1000 comprises a processor 1002, a cache memory 1004, and one or more executable modules and drivers, stored on a tangible computer readable medium, directed to the functions described herein. Additionally, hardware system 1000 may include a high performance input/output (I/O) bus 1006 and a standard I/O bus 1008. A host bridge 1010 may couple processor 1002 to high performance I/O bus 1006, whereas I/O bus bridge 1012 couples the two buses 1006 and 1008 to each other. A system memory 1014 and one or more network/communication interfaces 1016 may couple to bus 1006. Hardware system 1000 may further include video memory (not shown) and a display device coupled to the video memory. Mass storage 1018 and I/O ports 1020 may couple to bus 1008. Hardware system 1000 may optionally include a keyboard, a pointing device, and a display device (not shown) coupled to bus 1008. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1000 are described in greater detail below. In particular, network interface 1016 provides communication between hardware system 1000 and any of a wide range of networks, such as an Ethernet (e.g., IEEE 802.3) network, a backplane, and the like. Mass storage 1018 provides permanent storage for the data and programming instructions to perform the above-described functions implemented in servers 922 (FIG. 9), whereas system memory 1014 (e.g., DRAM) provides temporary storage for the data and programming instructions when executed by processor 1002. I/O ports 1020 are one or more serial and/or parallel communication ports that provide communication between additional peripheral devices, which may be coupled to hardware system 1000.

Hardware system 1000 may include a variety of system architectures, and various components of hardware system 1000 may be rearranged. For example, cache 1004 may be on-chip with processor 1002. Alternatively, cache 1004 and processor 1002 may be packed together as a "processor module," with processor 1002 being referred to as the "processor core." Furthermore, certain embodiments of the present disclosure may not require nor include all of the above components. For example, the peripheral devices shown coupled to standard I/O bus 1008 may couple to high performance I/O bus 1006. In addition, in some embodiments, only a single bus may exist, with the components of hardware system 1000 being coupled to the single bus. Furthermore, hardware system 1000 may include additional components, such as additional processors, storage devices, or memories.

An operating system manages and controls the operation of hardware system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit (ASIC).

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Modules, Components, and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an ASIC) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).)

Miscellaneous

One or more features from any embodiment may be combined with one or more features of any other embodiment without departing from the scope of the disclosure.

A recitation of "a," "an," or "the" is intended to mean "one or more" unless specifically indicated to the contrary.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., a cellular phone, smart phone, personal GPS, personal digital assistant, personal gaming device), that makes API calls directly to a server. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer-implemented system comprising:
a game display module to generate a game display for a game instance of a computer-implemented multiplayer game, the game instance being associated with a player of the game, and the game display including an environment view that shows a virtual in-game environment associated with the game instance;
a graphical user interface module that comprises one or more computer processors, the graphical user interface module being configured to generate a graphical user interface that forms part of the game display, the graphical user interface including a friends panel that is operable between:
a collapsed condition that provides a collapsed friends panel arranged such that the environment view is substantially unobscured by the collapsed friends panel, and
an expanded condition that provides an expanded friends panel which occupies a larger area of the game display than the collapsed friends panel and at least partially obscures the environment view, both the collapsed friends panel and the expanded friends panel providing friend information display functionality or friend communication functionality to the player, the graphical user interface being configured to switch the friends panel between the collapsed condition and the expanded condition responsive to player input.

2. The system of claim 1, further comprising:
a friends display module to operate the friends panel in a friends display mode in which the friends panel displays information about multiple friends of the player, and
a messaging module to operate the friends panel in a messaging mode in which the friends panel provides messaging functionality to the player,
the graphical user interface module being configured to switch the friends panel between the friends display mode and the messaging mode responsive to player input.

3. The system of claim 1, wherein the collapsed friends panel and the expanded friends panel display multiple friend cards that respectively show information about corresponding friends of the player, the expanded friends panel displaying a greater number of friend cards than the collapsed friends panel.

4. The system of claim 3, wherein the collapsed friends panel comprises a friends bar that displays a single row of friend cards, the expanded friends panel comprising a grid of friend cards having a plurality of rows of friend cards.

5. The system of claim 4, wherein the graphical user interface module is configured to automatically determine a size of the grid of friend cards based on an available screen area for the expanded friends panel in the game display.

6. The system of claim 3, wherein the graphical user interface module is configured to determine, upon returning the friends panel to the collapsed condition from the expanded condition, a selection and arrangement of friend cards for display in the collapsed friends panel based on criteria that exclude any intermediate navigation actions performed in the expanded friends panel.

7. The system of claim 3, wherein the graphical user interface module is configured to switch the friends panel from the expanded condition to the collapsed condition responsive to selection by the player of a particular friend card in the expanded friends panel.

8. The system of claim 7, wherein the graphical user interface module is configured to automatically display the particular friend card in a position of prime prominence in the collapsed friends panel immediately subsequent to selection of the particular friend card in the expanded friends panel.

9. The system of claim 3, wherein the graphical user interface (GUI) further comprises a batch send GUI element, the system further comprising a gifting module to automatically send a batch communication to a plurality of players whose friend cards are displayed in the expanded friends panel when the batch send GUI element is selected.

10. The system of claim 9, wherein the batch send GUI element is operable between an available state and an unavailable state, the gifting module being configured to switch the batch send GUI element to the unavailable state responsive to determining that a total number of friend players whose friend cards are currently displayed in the expanded friends panel and who are eligible to receive the batch communication is lower than a threshold value.

11. A computer-implemented method comprising:
   generating a game display for a game instance of a computer-implemented multiplayer game, the game display being associated with a player of the game and including an environment view that shows a virtual in-game environment associated with the game instance;
   in an automated operation using one or more computer processors, generating a graphical user interface that forms part of the game display, the graphical user interface including a friends panel that is operable between
      a collapsed condition that provides a collapsed friends panel arranged such that the environment view is substantially unobscured by the collapsed friends panel, and
      an expanded condition that provides an expanded friends panel which occupies a larger area of the game display than the collapsed friends panel and at least partially obscures the environment view, both the collapsed friends panel and the expanded friends panel providing friend information display functionality or friend communication functionality to the player; and
   switching the friends panel between the collapsed condition and the expanded condition responsive to player input.

12. The method of claim 11, wherein the friends panel is further operable between
   a friends display mode in which the friends panel displays information about multiple friends of the player, and
   a messaging mode in which the friends panel provides messaging functionality to the player,
the method further comprising switching the friends panel between the display mode and the messaging mode responsive to player input.

13. The method of claim 12, wherein the collapsed friends panel occupies a constant peripheral area of the game display, to allow unobscured visual access to the environment view, the expanded friends panel occupying an expanded area that includes the peripheral area and obscures a majority of the environment view.

14. The method of claim 12, wherein the collapsed friends panel and the expanded friends panel display multiple friend cards that respectively show information about corresponding friends of the player, the expanded friends panel displaying a greater number of friend cards than the collapsed friends panel.

15. The method of claim 14, wherein the collapsed friends panel comprises a friends bar that displays a single row of friend cards, and the expanded friends panel comprises a grid of friend cards.

16. The method of claim 15, wherein the switching of the friends panel between his the collapsed condition and the expanded condition responsive to player input comprises switching from the expanded friends panel to the collapsed friends panel responsive to selection by the player of a particular friend card in the expanded friends panel.

17. The method of claim 14, wherein the expanded friends panel comprises a plurality of pages of friend cards that are navigable responsive to player input to display one page of friend cards at a time.

18. The method of claim 14, wherein the expanded friends panel comprises a plurality of groups of friend cards that are grouped by type and/or status of the respective friends, the method further comprising displaying in the expanded friends panel a tab corresponding to each group, and displaying at least a subset of a particular one of the plurality of groups responsive to player selection of the corresponding tab.

19. The method of claim 18, wherein the displaying of the corresponding tab for at least one of the plurality of groups is conditional upon members of the at least one group exceeding a threshold value, the method further comprising determining that the number of friend cards in the at least one group exceeds the threshold value, and based on the determination, displaying the corresponding tab.

20. The method of claim 19, wherein the plurality of groups of friend cards are directly accessible only in the expanded friends panel, but not in the collapsed friends panel.

21. A graphical user interface for a computer-implemented multiplayer game, the graphical user interface comprising a friends panel that is operable between:
   a collapsed condition in which the friends panel provides friend information display functionality or friend communication functionality to a player associated with a game instance of the game that is displayed in a game display of which the graphical user interface forms part, the friends panel being sized and positioned in the collapsed condition to allow a substantially unobscured view of the game instance; and an expanded condition in which the friends panel provides friend information display functionality or friend communication functionality to the player, the friends panel being sized and positioned in the expanded condition to substantially obscure the game instance.

22. The graphical user interface of claim 21, wherein the friend information display functionality and/or the friend communication functionality of the friends panel in the expanded condition is augmented relative to that of the friends panel in the collapsed condition.

23. A non-transitory machine-readable storage medium storing instructions which, when performed by a machine, cause the perform operations comprising:
    generate a game display for a game instance of a computer-implemented multiplayer game, the game display being associated with a player of the game and including an environment view that shows a virtual in-game environment associated with the game instance;
    generate a graphical user interface that forms part of the game display, the graphical user interface including a friends panel that is operable between
        a collapsed condition that provides a collapsed friends panel arranged such that the environment view is substantially unobscured by the collapsed friends panel, and
        an expanded condition that provides an expanded friends panel which occupies a larger area of the game display than the collapsed friends panel and at least partially obscures the environment view, both the collapsed friends panel and the expanded friends panel providing friend information display functionality or friend communication functionality to the player; and
    switching the friends panel between the collapsed condition and the expanded condition responsive to player input.

* * * * *